US012614547B2

(12) United States Patent
Torikai et al.

(10) Patent No.: US 12,614,547 B2
(45) Date of Patent: Apr. 28, 2026

(54) METHOD FOR CONTROLLING UTTERANCE OF UTTERANCE DEVICE, SERVER CONTROLLING UTTERANCE OF UTTERANCE DEVICE, UTTERANCE DEVICE, AND PROGRAM

(71) Applicant: Panasonic Intellectual Property Management Co., Ltd., Osaka (JP)

(72) Inventors: Masafumi Torikai, Osaka (JP); Kentaro Nakai, Tokyo (JP); Hiroki Urabe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 659 days.

(21) Appl. No.: 17/765,606

(22) PCT Filed: Jun. 15, 2021

(86) PCT No.: PCT/JP2021/022685
§ 371 (c)(1),
(2) Date: Jan. 9, 2024

(87) PCT Pub. No.: WO2022/215277
PCT Pub. Date: Oct. 13, 2022

(65) Prior Publication Data
US 2024/0135924 A1    Apr. 25, 2024
US 2024/0233720 A9    Jul. 11, 2024

(30) Foreign Application Priority Data

Apr. 8, 2021    (JP) ................................. 2021-066049

(51) Int. Cl.
*G10L 15/22*        (2006.01)

(52) U.S. Cl.
CPC ........ *G10L 15/22* (2013.01); *G10L 2015/223* (2013.01)

(58) Field of Classification Search
None
See application file for complete search history.

(56) References Cited

U.S. PATENT DOCUMENTS

2013/0143512 A1*    6/2013    Hernandez .............. H04W 4/00
                                                                455/418
2019/0014209 A1*    1/2019    Hamme ........... H04M 3/42365
                            (Continued)

FOREIGN PATENT DOCUMENTS

EP        3 738 724        11/2020
JP        2015-18344        1/2015
                    (Continued)

OTHER PUBLICATIONS

International Search Report issued Sep. 7, 2021 in International (PCT) Application No. PCT/JP2021/022685.
(Continued)

*Primary Examiner* — Jonathan C Kim
(74) *Attorney, Agent, or Firm* — Wenderoth, Lind & Ponack, L.L.P.

(57)                ABSTRACT

A sound collection apparatus A server (10) causes a terminal device (30) to display a setting user interface, and receives a prohibition time zone setting command. Server sets a prohibition time zone for a target device based on the prohibition time zone setting command. Server (10) causes the target device to utter, when a time for causing the target device to utter is determined not to correspond to the prohibition time zone.

12 Claims, 19 Drawing Sheets

(56)     References Cited

U.S. PATENT DOCUMENTS

| | | | | |
|---|---|---|---|---|
| 2019/0281387 A1* | 9/2019 | Woo | | H04R 5/04 |
| 2019/0288970 A1 | 9/2019 | Siddiq | | |
| 2019/0347181 A1* | 11/2019 | Cranfill | | H04L 63/102 |
| 2020/0076939 A1* | 3/2020 | Lambourne | | H04W 4/20 |
| 2020/0341477 A1* | 10/2020 | Baek | | G05D 1/0044 |
| 2021/0029251 A1* | 1/2021 | Rathnam | | H04M 3/53341 |
| 2024/0135924 A1* | 4/2024 | Torikai | | G06F 3/167 |
| 2024/0430222 A1* | 12/2024 | Ciobanu | | H04M 3/42382 |

FOREIGN PATENT DOCUMENTS

| | | |
|---|---|---|
| JP | 2015-204510 | 11/2015 |
| JP | 2016-224393 | 12/2016 |
| JP | 2018-119734 | 8/2018 |
| JP | 6640266 | 2/2020 |

OTHER PUBLICATIONS

Extended European Search Report issued Oct. 24, 2024 in European Patent Application No. 21870515.0.

Japanese Office Action dated Feb. 28, 2023 in corresponding Japan Patent Application No. 2022-519348, with English machine translation.

English translation of International Preliminary Report on Patentability issued Oct. 10, 2023 in International (PCT) Application No. PCT/JP2021/022685.

Partial European Search Report issued Jul. 19, 2024 in European Patent Application No. 21870515.0.

\* cited by examiner

Figure 4:
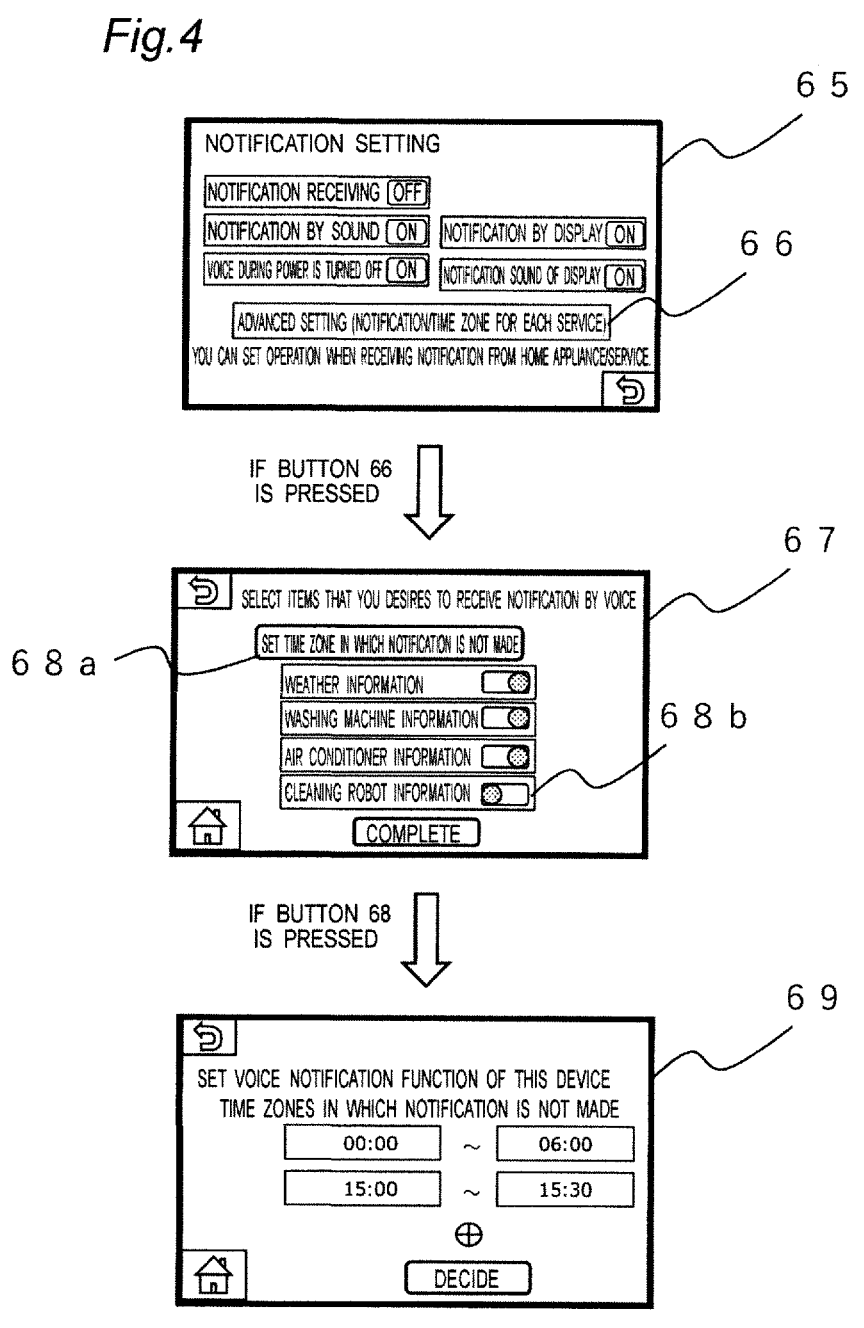

NOTIFICATION SETTING

NOTIFICATION RECEIVING [OFF]

NOTIFICATION BY SOUND [ON]    NOTIFICATION BY DISPLAY [ON]

VOICE DURING POWER IS TURNED OFF [ON]    NOTIFICATION SOUND OF DISPLAY [ON]

ADVANCED SETTING (NOTIFICATION/TIME ZONE FOR EACH SERVICE)    6 6

YOU CAN SET OPERATION WHEN RECEIVING NOTIFICATION FROM HOME APPLIANCE/SERVICE.

IF BUTTON 66
IS PRESSED 6 7

SELECT ITEMS THAT YOU DESIRES TO RECEIVE NOTIFICATION BY VOICE 6 8 a    SET TIME ZONE IN WHICH NOTIFICATION IS NOT MADE

WEATHER INFORMATION

WASHING MACHINE INFORMATION

AIR CONDITIONER INFORMATION    6 8 b

CLEANING ROBOT INFORMATION

COMPLETE

IF BUTTON 68
IS PRESSED 6 9

SET VOICE NOTIFICATION FUNCTION OF THIS DEVICE
TIME ZONES IN WHICH NOTIFICATION IS NOT MADE

00:00    ~    06:00

15:00    ~    15:30

⊕

DECIDE

Fig.5

| NUMBER | INFORMATION SOURCE APPARATUS/ EXTERNAL INFORMATION SOURCE | CONDITION | UTTERANCE CONTENT | REMARK |
|---|---|---|---|---|
| 1 | WASHING MACHINE | CASE WHERE RAIN IS FORECAST AFTER END OF WASHING | "WASHING HAS BEEN FINISHED. WEATHER IS FORECAST TO GET WORSE AFTER THIS." | UTTERANCE CONTENT THAT USER IS REQUIRED TO ACT AFTER COMPLETION NOTIFICATION |
| 2 | REFRIGERATOR | CASE WHERE CLEANING ASSIST OF REFRIGERATOR IS COMPLETED (RAPID COOLING, COOLING) | "CLEANING ASSIST OF REFRIGERATOR HAS BEEN COMPLETED." | UTTERANCE CONTENT THAT USER IS REQUIRED TO ACT AFTER COMPLETION NOTIFICATION |
| 3 | RICE COOKER | CASE WHERE REHEATING IS ENDED | "REHEATING OF RICE HAS BEEN ENDED. BREAK UP AND MIX THE RICE." | UTTERANCE CONTENT THAT USER IS REQUIRED TO ACT AFTER COMPLETION NOTIFICATION |
| 4 | MICROWAVE OVEN | CASE WHERE USE OF OVEN HAS BEEN COMPLETED | "HEATING OF OVEN HAS BEEN COMPLETED." | UTTERANCE CONTENT THAT USER IS REQUIRED TO ACT AFTER COMPLETION NOTIFICATION |
| 5 | ALL DEVICES | GENERAL ERRORS | •"ERROR HAS OCCURRED IN WASHING MACHINE. WATER CANNOT BE DRAINED. CHECK DRAIN HOSE AND DRAIN OUTLET." •"IS REFRIGERATOR DOOR OPEN." •"RULO STOPS DUE TO ERROR. BRUSH DOES NOT ROTATE. CHECK IT." •"ERROR HAS OCCURRED IN RICE COOKER. SINCE HEATING TIME EXCEEDS 96H, PRESS OFF BUTTON." •"HAS AIR PURIFIER FALLEN? CHECK IT." | UTTERANCE CONTENT THAT USER IS REQUIRED TO ACT AFTER ERROR NOTIFICATION |

*Fig.12A*

| DEVICE GROUP | GROUP MEMBER 1 | GROUP MEMBER 2 | GROUP MEMBER 3 |
|---|---|---|---|
| GROUP a | SMART SPEAKER | WASHING MACHINE | |
| GROUP b | TELEVISION | COURIER SERVICE INFORMATION | REFRIGERATOR |
| GROUP c | CLEANING ROBOT | MICROWAVE OVEN | RICE COOKER |

*Fig.12B*

| DEVICE GROUP | GROUP MEMBER 1 /REPRESENTATIVE DEVICE | GROUP MEMBER 2 | GROUP MEMBER 3 |
|---|---|---|---|
| GROUP a | SMART SPEAKER | WASHING MACHINE | |
| GROUP b | TELEVISION | COURIER SERVICE INFORMATION | REFRIGERATOR |
| GROUP c | CLEANING ROBOT | MICROWAVE OVEN | RICE COOKER |

Fig.17

| NUMBER | INFORMATION SOURCE APPARATUS/ EXTERNAL INFORMATION SOURCE | CONDITION | UTTERANCE CONTENT | REMARK |
|---|---|---|---|---|
| 1 | AIR CONDITIONER | CASE WHERE TEMPERATURE OF ROOM EXCEEDS PREDETERMINED VALUE, 35°C OR MORE (EXTREMELY HOT DAY 35°C) | "ROOM TEMPERATURE OF ROOM WHERE AIR CONDITIONER OF ○○ IS INSTALLED EXCEEDS 35° C. IT IS IN HIGH TEMPERATURE STATE." | UTTERANCE CONTENT THAT IS HIGHLY URGENT |
| 2 | AIR CONDITIONE | CASE WHERE TEMPERATURE OF ROOM EXCEEDS PREDETERMINED VALUE, CASE OF 10°C OR LESS | "ROOM TEMPERATURE OF ROOM WHERE AIR CONDITIONER OF ○○ IS INSTALLED FALLS BELOW 10° C. IT IS IN LOW TEMPERATURE STATE." | UTTERANCE CONTENT THAT IS HIGHLY URGENT |
| 3 | EMERGENCY INFORMATION DISTRIBUTION SERVICE | CASE WHERE EMERGENCY INFORMATION OCCURS | CASE WHERE LOTS OF DAMAGES OCCUR IN EVENT OF NATURAL DISASTERS SUCH AS GUST, LIGHTNING STRIKE, OR HEAVY RAIN, CASES (PHANTOM KILLER, ROBBERY, OR THE LIKE), ACCIDENTS (ROAD ACCIDENT, BLAST, OR THE LIKE), BASED ON REPORTS OR THE LIKE. OR IT IS PREDICTED THAT DAMAGE IS SPREADING, DISTRIBUTE INFORMATION ON NATURAL DISASTER, INCIDENT, OR ACCIDENT. | UTTERANCE CONTENT THAT IS HIGHLY URGENT |
| 4 | COURIER SERVICE | CASE WHERE THERE IS DELIVERY ATTEMPT NOTIFICATION | "DELIVERY ATTEMPT NOTIFICATION HAS REACHED FROM COURIER SERVICE. PLEASE DESIGNATE DATE AND TIME FOR REDELIVERY IF YOU HAVEN'T DONE IT." | UTTERANCE CONTENT THAT IS HIGH-PRIORITY |

METHOD FOR CONTROLLING UTTERANCE OF UTTERANCE DEVICE, SERVER CONTROLLING UTTERANCE OF UTTERANCE DEVICE, UTTERANCE DEVICE, AND PROGRAM

TECHNICAL FIELD

The present disclosure relates to an utterance device, a method for controlling utterance of an utterance device, a server controlling utterance of an utterance device, an utterance device, and a program.

BACKGROUND ART

Home appliances are an abbreviation for household appliances, and are, for example, electric appliances such as televisions, refrigerators, air conditioners, washing machines, cleaning robots, audio devices, lighting, water heaters, and interphones used at home. Conventionally, a beep sound or a buzzer sound is used to inform a user of the operating status of home appliances. For example, when the washing machine finishes washing, the air conditioner is activated, or the refrigerator door is not completely closed for more than a predetermined amount of time, these home appliances emit a beep sound to draw the user's attention.

At present, in order to convey more information to users of home appliances instead of a beep sound, home appliances as utterance devices capable of uttering using voice including human language have been developed. Such home appliances are called utterance devices, and instead of a beep sound, they utter, for example, "Washing has been finished." or "The refrigerator door is not closed." so as to inform the user of the information on the home appliances.

PRIOR ART DOCUMENTS

Patent Documents

Patent Document 1: JP 6640266 B2

SUMMARY

Problems to be Solved

Patent Document 1 discloses a message notification control system for causing a home appliance (controlled device electronic device) having an utterance function to utter. Specifically, the user registers the condition to be uttered by the home appliance, via a user intention registration application of a terminal device. The message notification control system detects the state of the home appliance, and if the detected state meets the registered condition (for example, the refrigerator is open), the home appliance is caused to utter a message.

However, the message notification control system of Patent Document 1 causes the home appliance to utter at any time of the day as long as the state of the home appliance to be detected satisfies the set condition. For example, the home appliance utters at a timing not expected to be uttered by the user, such as at midnight during sleep, so that discomfort may be given to the user.

An object of the present disclosure is to provide a technique capable of reducing discomfort given to a user by utterance of an utterance device.

Means for Solving the Problems

In order to solve the above-mentioned problem, the present disclosure provides a method for controlling utterance of an utterance device, a server controlling utterance of an utterance device, an utterance device, and a program.

A method for controlling utterance of an utterance device of one aspect according to the present disclosure includes: causing a terminal device to display a setting user interface; receiving, via the setting user interface, a prohibition time zone setting command; setting a prohibition time zone for a target device which is at least one of the utterance devices based on the prohibition time zone setting command; and causing the target device to utter when a time for causing the target device to utter is determined not to correspond to the prohibition time zone.

Further, a server controlling utterance of an utterance device of another aspect according to the present disclosure includes: a server storage that stores a prohibition time zone for the utterance device; and a server controller. The server controller is configured to: cause a terminal device to display a setting user interface; receive, via the setting user interface, a prohibition time zone setting command; set a prohibition time zone for a target device which is at least one of the utterance devices, based on the prohibition time zone setting command; and cause the target device to utter when a time for causing the target device to utter is determined not to correspond to the prohibition time zone.

Further, an utterance device of another aspect according to the present disclosure is an utterance device which is capable of uttering, and includes: a device storage that stores a prohibition time zone during which utterance is not possible; and a device controller. The device controller is configured to: receive a prohibition time zone setting command; set the prohibition time zone, based on the prohibition time zone setting command; receive an utterance command; and utter when a current time is determined not to correspond to the prohibition time zone.

Further, a method for controlling utterance of an utterance device of another aspect according to the present disclosure includes: receiving a prohibition time zone setting command; setting a prohibition time zone, based on the prohibition time zone setting command; receiving an utterance command; and uttering when a current time is determined not to correspond to the prohibition time zone.

Further, a program of another aspect according to the present disclosure is a program used in a terminal that communicates with the server controlling utterance of an utterance device, or used in the utterance device.

Effects

In the present disclosure, according to the method for controlling utterance of an utterance device, the server controlling utterance of an utterance device, and an utterance device, it is possible to reduce the discomfort given to the user by the utterance of the utterance device, so that the convenience of the utterance function can be improved.

BRIEF DESCRIPTION OF THE DRAWINGS

FIG. 4 is an example of a setting user interface in the first embodiment.

FIG. 5 is an example of an utterance hold criterion in the first embodiment.

FIG. 12A is an example of a device group device group in the fifth embodiment.

FIG. 12B is an example of a device group in the fifth embodiment.

FIG. 17 is an example of an utterance prohibition exception criterion in the seventh embodiment.

DETAILED DESCRIPTION

Figure 1:
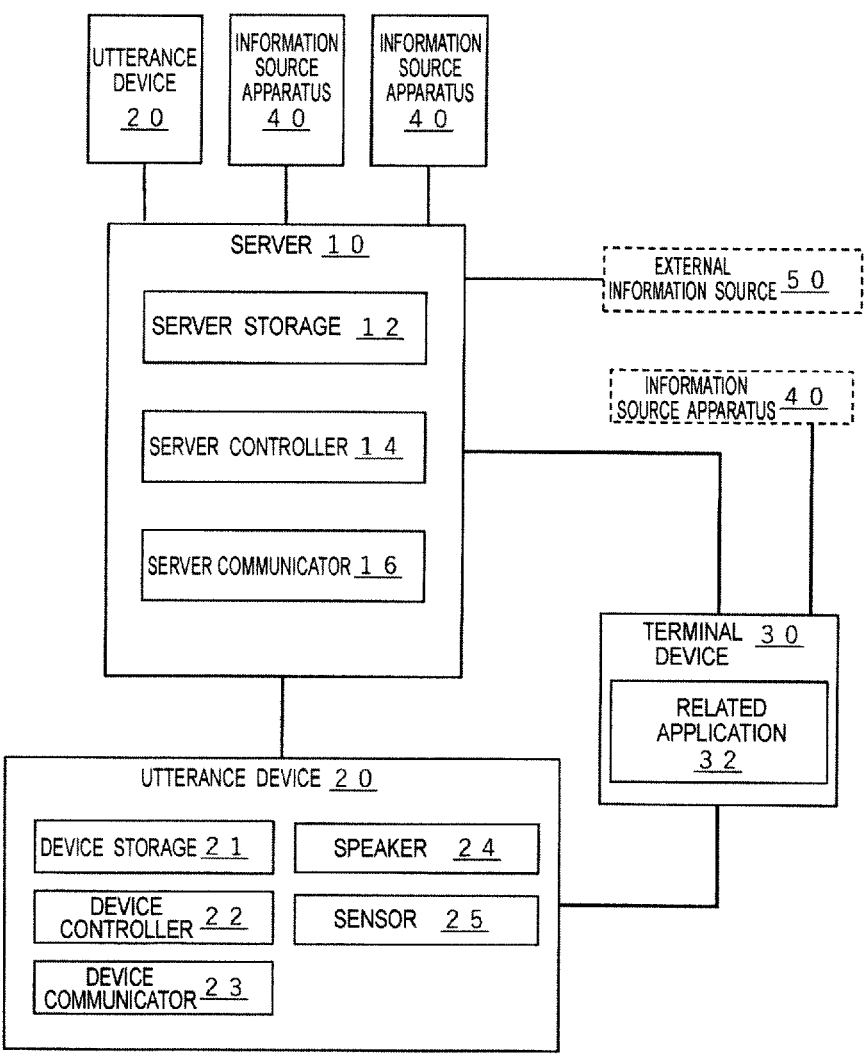
FIG. 1 is a block diagram showing a schematic configuration of an utterance device and a server controlling utterance of the utterance device in a first embodiment.

First, various aspects of a method for controlling utterance of an utterance device, a server controlling utterance of an utterance device, and an utterance device will be described.

A method for controlling utterance of an utterance device of a first aspect according to the present disclosure includes: causing a terminal device to display a setting user interface; receiving, via the setting user interface, a prohibition time zone setting command; setting a prohibition time zone for a target device which is at least one of the utterance devices based on the prohibition time zone setting command; and causing the target device to utter when a time for causing the target device to utter is determined not to correspond to the prohibition time zone.

In the method for controlling utterance of an utterance device of a second aspect according to the present disclosure, in the first aspect, the prohibition time zone setting command may be a first setting command including the target device and one or a plurality of first time zones for the target device. When setting the prohibition time zone, the prohibition time zone may be set to include the one or the plurality of the first time zones for the target device, based on the first setting command.

In the method for controlling utterance of an utterance device of a third aspect according to the present disclosure, in the first and second aspects, each of the utterance devices may be arranged in any one of a plurality of arrangement areas, and the prohibition time zone setting command may be a second setting command including a target area which is at least one of the arrangement areas and including a second time zone for the target area. When setting the prohibition time zone, the prohibition time zone may be set to include the second time zone for a target device which is the utterance device arranged in the target area, based on the second setting command.

The method for controlling utterance of an utterance device of a fourth aspect according to the present disclosure may further include, in the third aspect: receiving, via the setting user interface, a representative device setting command for designating one of the plurality of utterance devices arranged in the arrangement area as a representative device; setting the representative device for the arrangement area; and causing the representative device to utter, when a time for causing the target device arranged in the arrangement area to utter is determined not to correspond to the prohibition time zone of the representative device.

In the method for controlling utterance of an utterance device of a fifth aspect according to the present disclosure, in any one of the first to fourth aspects, the target device may be movable over a plurality of arrangement areas, and the prohibition time zone setting command may be a third setting command including a target area which is at least one of the arrangement areas and including a third time zone for the target area. The step of setting the prohibition time zone may include: setting the prohibition time zone to include the third time zone for the movable target device, based on the third setting command, when the movable target device is determined to have entered the target area; and setting the prohibition time zone not to include the third time zone for the movable target device, when the movable target device is determined to have left the target area.

The method for controlling utterance of an utterance device of a sixth aspect according to the present disclosure may further include, in any one of the first to fifth aspects, receiving, via the setting user interface, a grouping command that designates that at least one of the utterance devices belongs to a device group. The prohibition time zone setting command may be a fourth setting command including a fourth time zone for the device group. When setting the prohibition time zone, the prohibition time zone may be set to include the fourth time zone for a target device which is the utterance device belonging to the device group, based on the fourth setting command.

In the method for controlling utterance of an utterance device of a seventh aspect according to the present disclosure, in any one of the first to sixth aspects, the terminal device may include a first terminal and a second terminal. The method for controlling utterance of an utterance device may further include the following steps after receiving the prohibition time zone setting command and setting the prohibition time zone setting command to include the prohibition time zone. That is, the method may further include: receiving, via the setting user interface of the second terminal, another prohibition time zone setting command; setting a prohibition time zone for the target device, based on the another prohibition time zone setting command; and notifying the first terminal of the prohibition time zone set, based on the another prohibition time zone setting command, so that settings for the prohibition time zone between the first terminal and the second terminal are synchronized with each other.

The method for controlling utterance of an utterance device of an eighth aspect according to the present disclosure may further include, in any one of the first to seventh aspects, causing the target device to utter regardless of whether or not a current time corresponds to the prohibition time zone, when the target device is to be caused to utter and an utterance content is determined to correspond to an exception of an utterance prohibition.

A server controlling utterance of an utterance device of a ninth aspect according to the present disclosure includes: a server storage that stores a prohibition time zone for the utterance device; and a server controller. The server controller is configured to: cause a terminal device to display a setting user interface; receive, via the setting user interface, a prohibition time zone setting command; set a prohibition time zone for a target device which is at least one of the utterance devices, based on the prohibition time zone setting command; and cause the target device to utter, when a time for causing the target device to utter is determined not to correspond to the prohibition time zone.

In the server controlling utterance of an utterance device of a tenth aspect according to the present disclosure, in the ninth aspect, the prohibition time zone setting command may be a first setting command including the target device and one or a plurality of first time zones for the target device. The server controller may set, when setting the prohibition time zone, the prohibition time zone to include the one or the plurality of the first time zones for the target device, based on the first setting command.

In the server controlling utterance of an utterance device of an eleventh aspect according to the present disclosure, in the ninth and tenth aspects, each of the utterance devices may be arranged in any one of a plurality of arrangement areas, and the prohibition time zone setting command may be a second setting command including a target area which is at least one of the arrangement areas and including a second time zone for the target area. The server controller may set, when setting the prohibition time zone, the prohibition time zone to include the second time zone for a target device which is the utterance device arranged in the target area, based on the second setting command.

In the server controlling utterance of an utterance device of a twelfth aspect according to the present disclosure, in the eleventh aspect, the server controller may be further configured to: receive, via the setting user interface, a representative device setting command for designating one of the plurality of utterance devices arranged in one arrangement area as a representative device; set the representative device for the arrangement area; and cause the representative device to utter, when a time for causing the target device arranged in the arrangement area to utter is determined not to correspond to the prohibition time zone of the representative device.

In the server controlling utterance of an utterance device of a thirteenth aspect according to the present disclosure, in any one of the ninth to twelfth aspects, the target device may be movable over a plurality of arrangement areas, and the prohibition time zone setting command may be a third setting command including a target area which is at least one of the arrangement areas and including a third time zone for the target area. The server controller may be further configured to, when setting the prohibition time zone: set the prohibition time zone to include the third time zone for the movable target device, based on the third setting command, when the movable target device is determined to have entered the target area; and set the prohibition time zone not to include the third time zone for the movable target device when the movable target device is determined to have left the target area.

In the server that controls utterance of an utterance device of a fourteenth aspect according to the present disclosure, in any one of the ninth to thirteenth aspects, the server controller may be further configured to receive, via the setting user interface, a grouping command that designates that at least one of the utterance devices belongs to a device group. The prohibition time zone setting command may be a fourth setting command including a fourth time zone for the device group. The server controller may set, when setting the prohibition time zone, the prohibition time zone to include the fourth time zone for a target device which is the utterance device belonging to the device group based on the fourth setting command.

In the server controlling utterance of an utterance device of a fifteenth aspect according to the present disclosure, in any one of the ninth to fourteenth aspects, the terminal device may include a first terminal and a second terminal. The server controller may be further configured to, after receiving the prohibition time zone setting command and setting the prohibition time zone setting command to include the prohibition time zone: receive, via the setting user interface of the second terminal, another prohibition time zone setting command; set a prohibition time zone for the target device, based on the another prohibition time zone setting command; and notify the first terminal of the prohibition time zone set, based on the another prohibition time zone setting command, so that settings for the prohibition time zone between the first terminal and the second terminal are synchronized with each other.

In the server controlling utterance of an utterance device of a sixteenth aspect according to the present disclosure, in any one of the ninth to fifteenth aspects, the server controller may be further configured to cause the target device to utter regardless of whether or not a current time corresponds to the prohibition time zone, when an utterance content is determined to correspond to an exception of an utterance prohibition and the target device is to be caused to utter.

An utterance device of a seventeenth aspect according to the present disclosure is an utterance device which is capable of uttering, and includes: a device storage that stores a prohibition time zone during which utterance is not possible; and a device controller. The device controller is configured to: receive a prohibition time zone setting command; set the prohibition time zone, based on the prohibition time zone setting command; receive an utterance command; and utter when a current time is determined not to correspond to the prohibition time zone.

A method for controlling utterance of an utterance device of an eighteenth aspect according to the present disclosure includes: receiving a prohibition time zone setting command; setting a prohibition time zone, based on the prohibition time zone setting command; receiving an utterance command; and uttering when a current time is determined not to correspond to the prohibition time zone.

A program of a nineteenth aspect in the present disclosure is a program used in a terminal that communicates with the server controlling utterance of an utterance device in any one of the ninth to sixteenth aspects, or used in the utterance device in the seventeenth aspect.

First Embodiment

Hereinafter, a first embodiment of a method for controlling utterance of an utterance device, a server controlling utterance, an utterance device, and a program according to the present disclosure will be described in detail with reference to the drawings as appropriate.

The first embodiment described below shows an example of the present disclosure. The numerical values, shapes, configurations, steps, and the order of steps shown in the first embodiment below are examples, and do not limit the present disclosure. Among the components in the following first embodiment, components that are not described in the independent claim indicating the most generic concept are described as optional components.

In the first embodiment described below, a modified example may be shown for a specific element, and for other elements, an optional combination is included, and each effect is exhibited in the combined configuration. In the first embodiment, by combining the configurations of the respective modified examples, the effect in each modified example can be exhibited.

In the detailed description below, terms such as "first" and "second" are used for illustration purposes only and it should not be understood that the terms express or imply the order of relative importance or technical features. Features limited to "first" and "second" express or imply including one or more of these features.

FIG. 1 is a block diagram showing a schematic configuration of an utterance device and a server controlling utterance of the utterance device in the first embodiment. A server 10 (hereinafter, abbreviated as "server 10") can also communicate with at least one utterance device 20 capable of uttering and with a terminal device 30 related to the utterance device 20. The server 10 may receive information from at least one information source apparatus 40 or at least one external information source 50, and cause the utterance device 20 to utter, based on the received information. The outline of each component will be described below.

<Utterance Device 20>

The utterance device 20 is a device having an utterance function. The utterance device 20 of the first embodiment includes a home appliance having an utterance function (utterance home appliance). The home appliance is an abbreviation for a household appliance. The utterance device 20 may be any kind of device as long as it is an electronic device used at home, and includes electronic devices such as a television, a refrigerator, an air conditioner, a washing machine, a cleaning robot, an audio device (smart speaker), a lighting, a water heater, and an interphone used at home. The utterance device 20 may be referred to as a "consumer utterance device" or an "utterance home appliance". The utterance function is a function of using a speaker to utter voice including human language. The utterance function is different from the function of uttering only sounds such as a beep sound, a buzzer sound, and an alarm, which does not include the human language, and can convey more information to the user using the human language. The utterance device 20 as an utterance home appliance is configured to exert each home appliance function. For example, the utterance device 20 which is an air conditioner includes a compressor, a heat exchanger, and an indoor temperature sensor, and is configured to perform cooling, heating, and dehumidifying functions for a control space. Further, for example, the utterance device 20 which is a cleaning robot includes a battery, a dust collecting mechanism, a moving mechanism, and an object detection sensor, and is configured to perform cleaning while moving within a movable range.

In the embodiment of FIG. 1, the utterance device includes a device storage 21 (home appliance storage) that stores information for exerting the function of the utterance device 20, a device controller 22 (home appliance controller) that controls the entire utterance device 20, a device communicator 23 (home appliance communicator) capable of communicating with the server 10 or the terminal device 30, and a speaker 24 for uttering. The utterance device 20 may include at least one of various sensors 25 to perform its function. The utterance device 20 may include a display for displaying visual information to the user. In the present disclosure, the utterance device 20 of this example are described, but other utterance devices 20 may have the same configuration.

The device storage 21 is a recording medium for recording various information and control programs, and may be a memory that functions as a work area of the device controller 22. The device storage 21 is realized, for example, by a flash memory, RAM, other storage devices, or a combination thereof as appropriate. The device storage 21 may store voice data or video data for utterance. The voice data or video data for utterance may be stored before shipment of the utterance device 20, may be read from another storage medium based on a command from a seller or a user in the home, or may be downloaded via the Internet based on a command from a seller or a user.

The device controller 22 is a controller that controls the entire utterance device 20. The device controller 22 includes general-purpose processors such as CPU, MPU, FPGA, DSP, and ASIC that realize a predetermined function by executing a program. The device controller 22 can realize various controls in the utterance device 20 by calling and executing a control program stored in the device storage 21. Further, the device controller 22 can read/write the data stored in the device storage 21 in cooperation with the device storage 21. The device controller 22 is not limited to the one that realizes a predetermined function by the cooperation of hardware and software, and may be a hardware circuit specially designed to realize a predetermined function.

The device controller 22 can receive various set values by the user (for example, a set temperature of an air conditioner, a display channel of a television, and a cleaning time of a cleaning robot), via a setting user interface. The device controller 22 controls each unit of the utterance device 20 so as to exert the home appliance function of the utterance device 20, based on these set values and the detected values (for example, a room temperature and presence/absence of an object) received from the various sensors 25. The device controller 22 may receive a command from the server 10 or the terminal device 30 and control the utterance device 20 according to the command. Further, the device controller 22 utters according to a command from the server 10, based on a method for controlling the utterance of the utterance device described later.

The device communicator 23 can also communicate with the server 10, the user's terminal device 30, and the like, and can, for example, send and receive Internet packets. When the device controller 22 cooperates with the server 10 via the device communicator 23, the device controller 22 can receive a parameter value or a command related to the utterance from the server 10 via the Internet.

The speaker 24 uses voice data designated by the device controller 22 to convert an electric signal into an acoustic signal and radiate it into a space as a sound wave. The speaker 24 may communicate with the device controller 22 via a voice interface. The speaker 24 may be appropriately provided based on the type of the utterance device 20 and the like. For example, in the utterance device 20 which is a television, the speakers 24 may be provided on both sides of the front surface of the television. In the utterance device 20 which is a cleaning robot, the speaker 24 may be provided in a housing of the cleaning robot. The speaker 24 of each utterance device 20 may have a different criterion, an utterance/speaking ability. For example, the speaker 24 of the television may have a relatively high utterance/speaking ability, while the speaker 24 of the washing machine may have a relatively low utterance/speaking ability. The present disclosure does not limit the utterance/speaking ability of the speaker 24.

The utterance device 20 may include a display. The display is for displaying visual information to the user. The display may have a high resolution to display a beautiful video like, for example, a TV screen, or a panel display having a low resolution to display a user interface (UI) for setting in a washing machine or a microwave oven. The present disclosure does not limit the display capability of the display. Further, the display may be a touch panel having a display function.

The sensor 25 is for acquiring various information from the outside of the utterance device 20 in order to exert the function of the utterance device 20. For example, the sensor 25 may be an indoor temperature sensor that detects the temperature inside a room provided with an air conditioner, an outdoor temperature sensor that detects the temperature outside a room provided with an air conditioner, an object sensor that detects the presence or absence of an object in front of a cleaning robot, or an open/close sensor that detects whether or not a door of a refrigerator is completely closed. The information detected by the sensor 25 is input to and stored in the device storage 21, and is later used by the device controller 22 or sent to the terminal device 30 or the server 10.

<Terminal Device 30>

The terminal device 30 is a device related to the utterance device 20. The terminal device 30 may be, for example, a controller of the utterance device 20 or a controller capable of simultaneously managing and controlling a plurality of types of home appliances. Further, the terminal device 30 may be an information terminal capable of performing data communication with the utterance device 20, for example, a smartphone, a mobile phone, a tablet, a wearable device, a computer, etc., in which a dedicated related application 32 is embedded. The server 10 or the device controller 22 can acquire the settings or commands input by the user, via the terminal device 30. Generally, the terminal device 30 includes a display for displaying a graphical user interface (GUI). However, when interacting with the user via a voice user interface (VUI), the terminal device 30 may include a speaker and a microphone instead of or in addition to the display.

<Information Source Apparatus 40>

The information source apparatus 40 is an information source related to the content uttered by the utterance device 20. The information source apparatus 40 may be another device (home appliance) in the home provided with the utterance device 20. When the information source apparatus 40 is another device (home appliance), the information source apparatus 40 is also referred to as an information source device (information source home appliance) in the present disclosure. The information source home appliance may be the utterance device 20, or may be a home appliance having no utterance function. The information source apparatus may send device information (home appliance information) such as its operating state to the server 10, and the server 10 may set the utterance content based on the received device information. Examples of the device information include, for example, a startup state of the information source home appliance, an operation mode, abnormality information, a current position, a nearest user, and the like.

<External Information Source 50>

The external information source 50 is an information source that provides information on services that are not directly related to the utterance device, such as weather information and information on a delivery status of a courier service. The server 10 may set the utterance content based on the information acquired from the external information source 50.

<Server 10>

The server 10 is a server controlling at least one utterance device 20. More specifically, the server 10 controls at least one utterance device 20 to utter using voice data or video data including a human language. In one embodiment, the server 10 can connect to at least one utterance device 20 via the Internet to control utterance. The server 10 can control a plurality of utterance devices installed in the same home at one time.

The server 10 may be used for other purposes other than the execution of the method for controlling utterance of the utterance device described later. For example, the server 10 may be a management server of a manufacturer of the utterance device 20 for managing at least one utterance device 20 or for collecting data. Alternatively, the server 10 may be an application server. In the first embodiment, the server 10 includes a server storage 12 and a server controller 14. The server 10 may further include a server communicator 16 for communicating with the utterance device 20, the terminal device 30, the information source apparatus 40, or the external information source 50.

<Server Storage 12>

The server storage 12 is a recording medium for recording various information and control programs, and may be a memory that functions as a work area of the server controller 14. The server storage 12 is realized, for example, by a flash memory, a solid state device (SSD), a hard disk, RAM, other storage devices, or a combination thereof as appropriate. The server storage 12 may be a memory inside the server 10, or may be a storage device connected to the server 10 by wireless communication or wired communication.

The server storage 12 stores voice data or video data for utterance. The voice data or video data for various utterances may be generated according to the type of utterance device 20 subject to utterance control, device information of the utterance device 20, the type of information source apparatus 40, the type of external information source 50, information acquired from the information source apparatus 40 or the external information source 50, or the like. In one embodiment, the server 10 generates voice data or video data for utterance in advance and stores it in the server storage 12 before causing the utterance device 20 to utter. In another embodiment, the server 10 dynamically (at the time of execution) generates voice data or video data for utterance immediately before making utterance, and stores it in the server storage 12. The server storage 12 may store material data for generating these voice data or video data, or data in the middle.

<Server Controller 14>

The server controller 14 of the server 10 is a controller that controls the entire server 10. The server controller 14 includes general-purpose processors such as a CPU, MPU, GPU, FPGA, DSP, and ASIC that realize a predetermined function by executing a program. The server controller 14 can realize various controls on the server 10 by calling and executing the control program stored in the server storage 12. Further, the server controller 14 can read/write the data stored in the server storage 12 in cooperation with the server storage 12. The server controller 14 is not limited to the one that realizes a predetermined function by the cooperation of hardware and software, and may be a hardware circuit specially designed to realize a predetermined function.

<Server Communicator 16>

The server communicator 16 can also cooperate with the server controller 14 to send and receive Internet packets to and from the utterance device 20, the terminal device 30, the information source apparatus 40, the external information source 50, and the like, that is, to communicate with these. For example, the server 10 may receive a command from the terminal device 30 via the server communicator 16, may send an instruction to the utterance device 20, and may receive information from the information source apparatus 40 or the external information source 50. The server communicator 16 or the device communicator 23 may perform communication with the server 10, the utterance device 20, the terminal device 30, the information source apparatus 40, and the external information source 50 according to criteria such as Wi-Fi (registered trademark), IEEE802. 2, IEEE802.3, 3G, and LTE to send and receive data. Communication may be performed via, in addition to the Internet, Intranet, Extranet, LAN, ISDN, VAN, CATV communication network, virtual dedicated network, telephone line network, mobile communication network, satellite communication network, infrared rays, or Bluetooth (registered trademark).

<Method for Controlling Utterance of Utterance Device>

Figure 2:
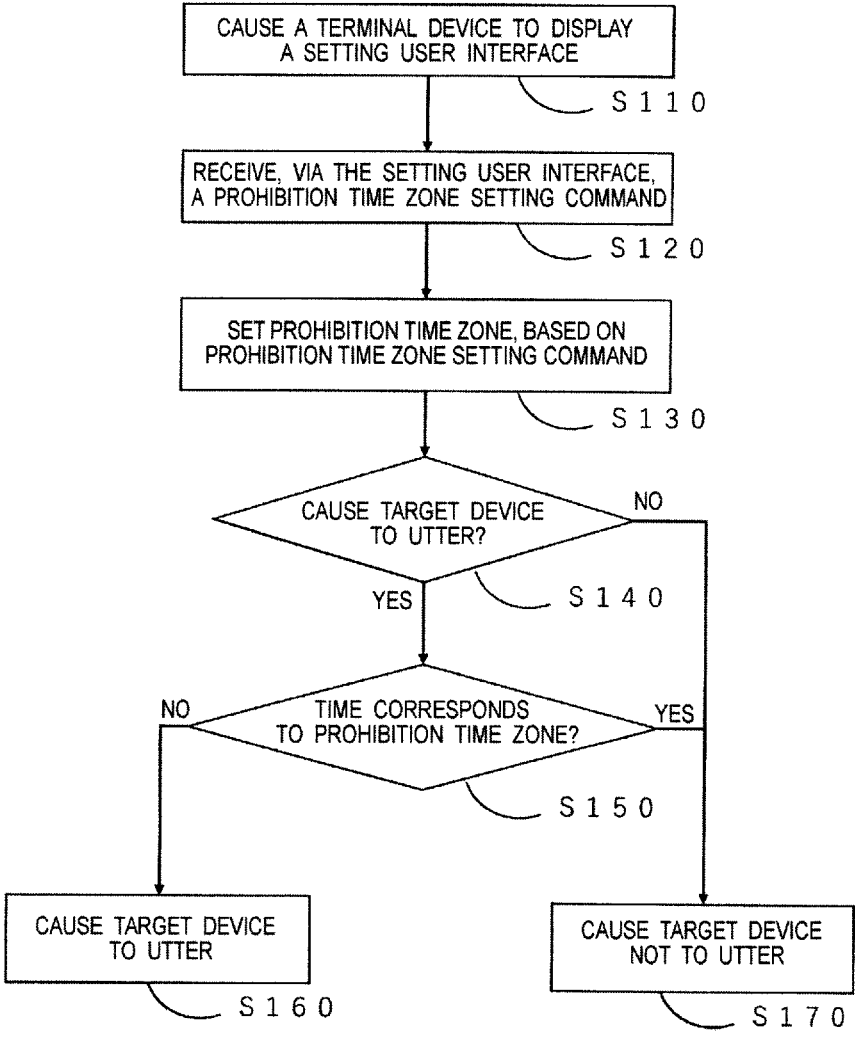
FIG. 2 is a flowchart of an example of a method for controlling an utterance device in the first embodiment.

The server 10 executes the method for controlling utterance of the utterance device 20 by using the server storage 12 and the server controller 14. In this method, an utterance prohibition time zone is set based on the user's instruction so as to reduce discomfort given to the user by utterance. FIG. 2 is a flowchart of the method for controlling utterance of the utterance device in the first embodiment, and the method for controlling utterance of the utterance device includes the following steps S110 to S170.

The server controller 14 of the server 10 causes the terminal device 30 related to the utterance device 20 to display a setting UI so as to prompt the user to set the prohibition time zone (step S110). The user can input the prohibition time zone for at least one utterance device 20 via the setting UI. The prohibition time zone is a time zone in which the user thinks that the utterance of the home appliance is not desirable. For example, the prohibition time zone may generally be a time zone corresponding the midnight time zone during sleep from 0:00 to 6:00, or a time zone from 16:00 to 19:00 when a child studies.

Upon receiving the input in the setting UI, the terminal device 30 sends a prohibition time zone setting command to the server. The server controller 14 receives the prohibition time zone setting command, via the setting UI and the server communicator 16 (step S120). The server controller 14 sets the prohibition time zone for a target device, which is at least one of the utterance devices 20, based on the prohibition time zone setting command (step S130). One or a plurality of prohibition time zones may be set for one utterance device 20. An upper limit may be set for the number of prohibition time zones that can be set for one utterance device 20 so that management of the prohibition time zone is not complicated. For example, one utterance device 20 may be restricted so that up to three prohibition time zones can be set.

The prohibition time zone setting command may include, for example, a prohibition time zone and information for specifying the utterance device 20 (target device) which is a target of application of the prohibition time zone. The target device is a target of application of the prohibition time zone designated in the prohibition time zone setting command, and the prohibition time zone setting command may designate the target device by an identifier or a name of the utterance device 20.

In one embodiment, the prohibition time zone setting command is a first setting command including the target device and one or a plurality of first time zones for the target device. In step S130, the server controller 14 sets the target device, so that the prohibition time zone includes one or a plurality of first time zones based on the first setting command. For example, the prohibition time zone setting command includes the utterance device "television" and the first time zone "00:00 to 06:00". When the server controller 14 receives this prohibition time zone setting command, the server controller 14 sets the "television" as the target device, makes a setting so as to add the first time zone "00:00 to 06:00" as the prohibition time zone of the "television", and stores the setting result in the server storage 12.

Figure 3A:
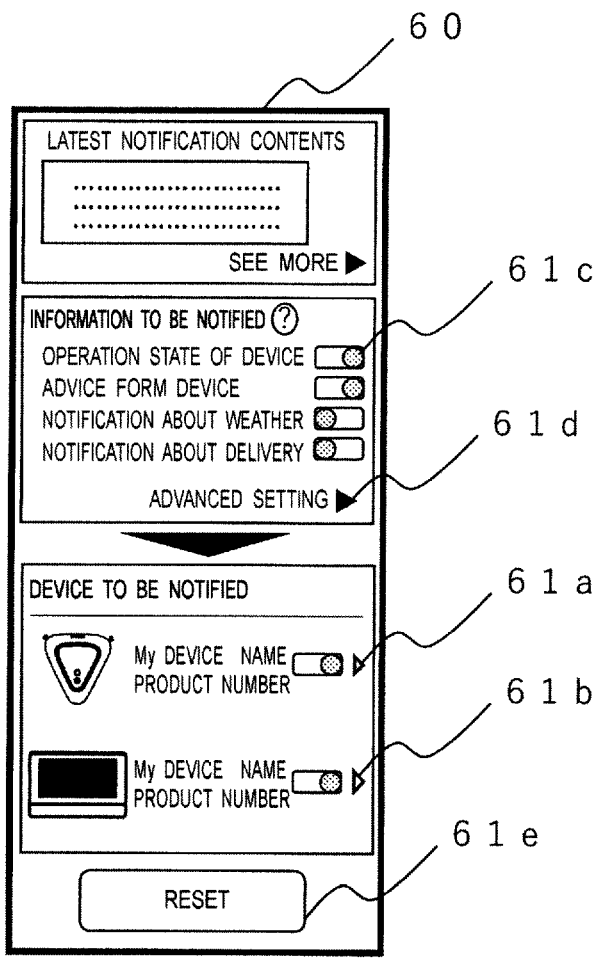
FIG. 3A is an example of a setting user interface in the first embodiment.
Figure 3B:
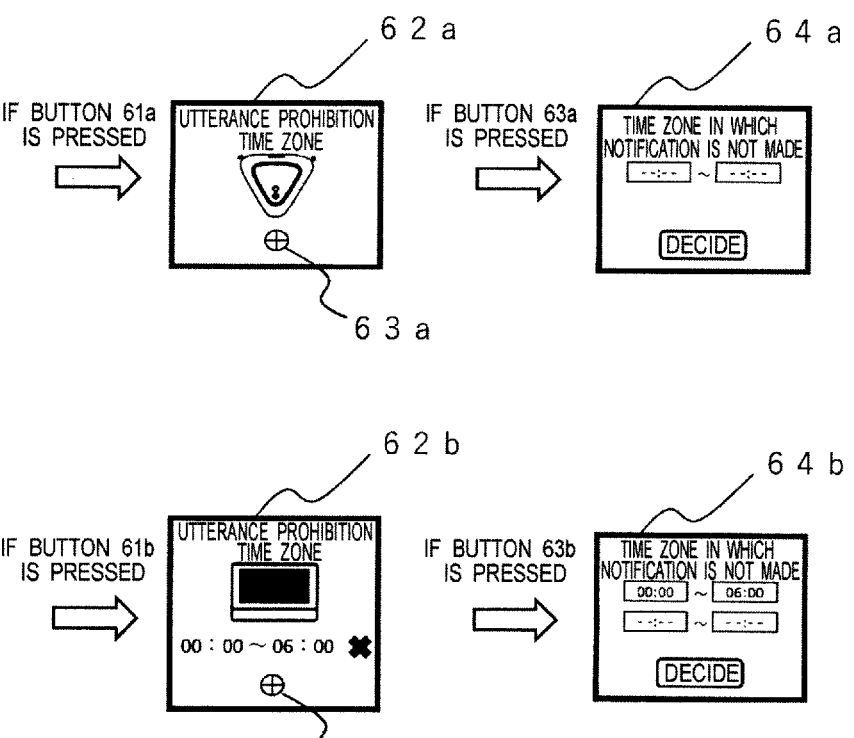
FIG. 3B is an example of a setting user interface in the first embodiment.

FIGS. 3A and 3B are examples of a screen 60 of the setting UI when the terminal device 30 is a smartphone in which the dedicated related application 32 is embedded. The setting UI including the screen 60 of FIGS. 3A and 3B may be an UI of the related application 32. On the screen 60 shown in FIG. 3A, when a button 61a on the screen 60 is pressed, an utterance prohibition time zone can be set for the utterance device 20 which is a "cleaning robot", and when a button 61b is pressed, an utterance prohibition time zone can be set for the utterance device 20 which is a "television". Further, in this embodiment, on the screen 60, a switch button 61c for setting whether or not a specific utterance device 20 can utter, a button 61d for setting the utterance function in more detail, a button 61d for making the setting again, and the like are also provided.

When the button 61a is pressed, the setting UI transitions to a screen 62a shown in FIG. 3B and displays the prohibition time zone of the "cleaning robot" corresponding to the button 61a. In the example of the screen 62a, the prohibition time zone is not yet set for the "cleaning robot", and a new prohibition time zone can be set by pressing a button 63a. When the button 63a is pressed, the setting UI transitions to a screen 64a and prompts the user to input the prohibition time zone.

Similarly, when the button 61b is pressed, the setting UI transitions to a screen 62b shown in FIG. 3B and displays the prohibition time zone of the "television" corresponding to the button 61b. In the example shown on the screen 62b, a prohibition time zone of "00:00 to 06:00" has already been set for the "television". By pressing a button 63b on the screen 62b, the set prohibition time zone can be changed or an additional prohibition time zone can be set. When the button 63b is pressed, the setting UI transitions to a screen 64b, and prompts the user to input an additional prohibition time zone.

When the user inputs a prohibition time zone on the screen 64a or the screen 64b, the terminal device 30 sends a first setting command including the input prohibition time zone and the identifier of the utterance device 20 corresponding to the prohibition time zone to the server 10. The server controller 14 sets the prohibition time zone for the "cleaning robot" or the "television" as the target device based on the first setting command received, via the server communicator 16.

FIG. 4 is an example of the setting UI when the terminal device 30 is a controller of the utterance device 20. When the utterance device 20 includes a display, the server controller 14 may display the setting UI shown in FIG. 4 on the display of the utterance device 20. On the screen 65 shown in FIG. 4, information about the utterance device 20 corresponding to the controller that displays the setting UI or the utterance function of the utterance device 20 that displays the setting UI, or the setting button 66 is provided.

In this embodiment, when the button 66 on the screen 65 is pressed, the setting UI transitions to a screen 67. On the screen 67, the prohibition time zone is displayed by a button 68a. Further, on the screen 67, the information source apparatus 40 or the external information source 50 to be associated with the utterance device 20 can be set by the button 68b. The server controller 14 can cause the utterance device 20 to utter based on the information on the associated information source apparatus 40 or external information source 50 (that is, the item set to be ON on the screen 67).

When the button 68a on the screen 67 is pressed, the setting UI transitions to a screen 69 and displays the prohibition time zone of the utterance device 20. As shown on the screen 69, the prohibition time zones of "00:00 to 06:00" and "15:00 to 15:30" have already been set for the utterance device 20. The user can change the existing prohibition time zone or set an additional prohibition time zone through the screen 69 of the setting UI.

Then, the server controller 14 performs utterance control for the utterance device 20, based on the set prohibition time zone. The server controller 14 determines whether or not to cause the target device to utter, based on the information received from the information source apparatus 40 or the external information source 50 (step S140). More specifically, the server controller 14 determines whether or not a predetermined utterance condition is satisfied based on the received information, and sets an utterance content corresponding to the predetermined utterance condition. For example, when the server controller 14 receives the information that the washing has been ended from the information source apparatus of the "washing machine" and further receives the information such as a rain forecast from the external information source 50, the server controller 14 may cause the target device of the smart speaker to utter an utterance content "Washing has been finished. Weather is forecast to get worse after this".

When the target device is to be caused to utter, the time for causing the target device to utter, that is, the current time is determined whether or not to correspond to the prohibition time zone of the target device (step S150). It is assumed that the server controller 14 receives the information that the washing has been ended from the information source apparatus 40 of the "washing machine", and the server controller 14 causes the target device of the "smart speaker" to utter the information. Further, it is assumed that a prohibition time zone of "00:00 to 06:00" is set for the "smart speaker". In this case, the server controller 14 acquires the current time and determines whether or not the current time is within the prohibition time zone. For example, if the current time is "05:00", it corresponds to the prohibition time zone, and if the current time is "09:00", the current time does not correspond to the prohibition time zone.

When the current time is determined not to correspond to the prohibition time zone, the server controller 14 causes the target device to utter (step S160). For example, the target device of the "smart speaker" may be caused to utter the utterance content "Washing has been finished". On the other hand, when the current time it is determined to correspond to the prohibition time zone, the server controller 14 controls the target device so as not to utter (step S170).

In one embodiment, when the current time is determined to correspond to the prohibition time zone, the server controller 14 discards the content to be uttered in step S140. That is, the target device is not caused to utter the content even after the prohibition time zone.

In another embodiment, when the current time is determined to correspond to the prohibition time zone, the server controller 14 further determines whether or not the utterance content corresponds to an "utterance hold criterion". The utterance hold criterion defines that the user should be notified over time, for example, that the user must act when he/she hears the notification, that is, that the importance of the utterance content is relatively high for the user. The utterance hold criterion may be stored in the server storage 12. When the utterance content is determined to not to correspond to the utterance hold criterion, that is, when the importance of the utterance content is relatively low for the user, the server controller 14 does not cause the target device to utter the utterance content and discards the utterance content. On the other hand, when the utterance content is determined to correspond to the utterance hold criterion, that is, when the importance of the utterance content is relatively high for the user, the server controller 14 does not cause the target device to utter the utterance content during the prohibition time zone, but when the prohibition time zone ends, the server controller 14 causes the target device to utter the utterance content.

FIG. 5 is an example of the utterance hold criterion in the first embodiment. For example, for the number 1, if conditions that the washing has been ended and there is a rain forecast are satisfied, the target device is caused to utter an utterance content "Washing has been finished. Weather is forecast to get worse after this". If the current time corresponds to the prohibition time zone of the target device, the target device is not immediately caused to utter the utterance content, but since the utterance content corresponds to the utterance hold criterion, after the prohibition time zone ends, the server controller 14 causes the "smart speaker" to utter the utterance content. This allows the user to dry the laundry indoors or dry the laundry by using a clothes dryer.

Further, in one embodiment, the terminal that communicates with the server 10, for example, the utterance device 20 or the terminal device 30, has a program used to execute the utterance control as described above.

As a result, the server controller 14 completes the utterance control process. The server controller 14 can set a prohibition time zone for the utterance device 20 and control the utterance device 20 so as not to utter within the prohibition time zone. According to the method, server, utterance device, and program for controlling utterance of this utterance device, the utterance device 20 is not caused to utter during the prohibition time zone when the user thinks that utterance is not desirable, so that the discomfort given to the user can be reduced more securely. In addition, since the user can easily set the prohibition time zone via the setting UI, the convenience of the utterance function can be improved. Further, since the server 10 can temporarily hold the utterance content corresponding to the utterance hold criterion and the utterance content may be uttered after the end of the prohibition time zone, it is possible to notify the user without leaking important information.

Second Embodiment

<Case of Target Device Arranged in Specific Arrangement Area>

In a second embodiment, each of the utterance devices 20 is arranged in any one of a plurality of arrangement areas. The server controller 14 can set a prohibition time zone for each arrangement area.

Figure 6:
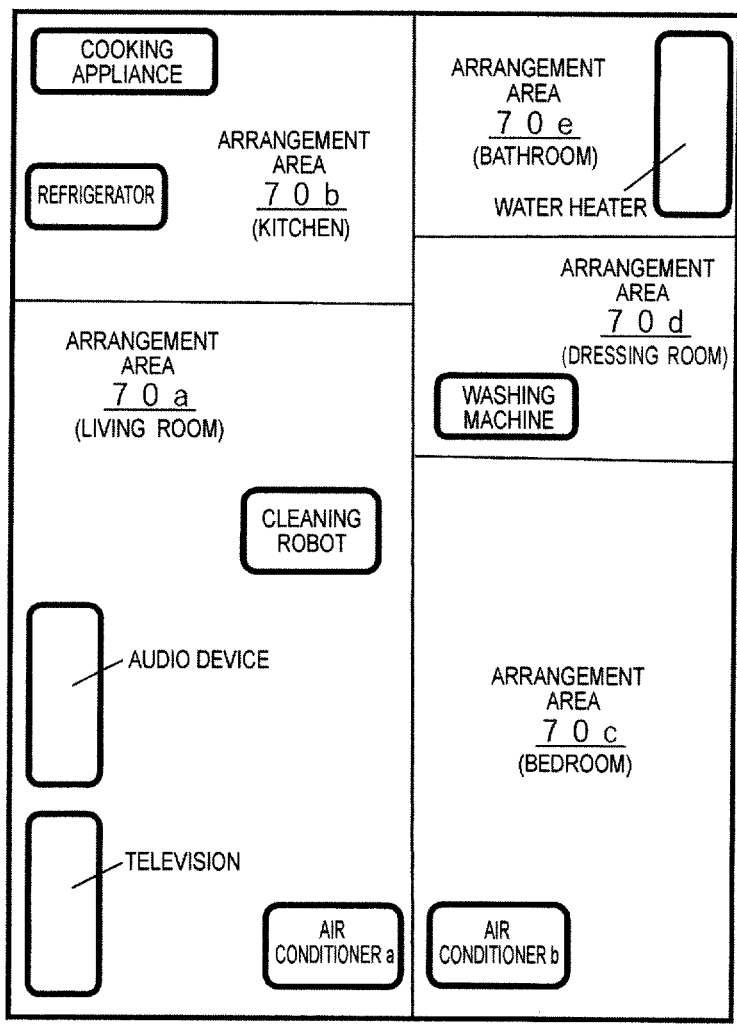
FIG. 6 is an example of arrangement areas in a second embodiment.

FIG. 6 is an example of the arrangement areas in the second embodiment. In this example, the space in the home is divided into an arrangement area 70a (living room), an arrangement area 70b (kitchen), an arrangement area 70c (bedroom), an arrangement area 70*d* (dressing room), and an arrangement area 70*e* (bathroom). Various utterance devices 20, such as a television, an audio device, air conditioners, a cleaning robot, a cooking appliance, a refrigerator, a washing machine, and a water heater, are arranged in any of the arrangement areas 70*a* to 70*e*.

In the second embodiment, the prohibition time zone setting command is a second setting command including a target area which is at least one of the arrangement areas 70*a* to 70*e* and including a second time zone for the target area. Then, in step S130, the server controller 14 sets a prohibition time zone to include the second time zone for the target device(s) which is the utterance device(s) arranged in the target area, based on the second setting command.

In one embodiment, the server controller 14 may set the prohibition time zone to include the second time zone for all the utterance devices arranged in the target area among the arrangement areas 70*a* to 70*e*. For example, the user may designate the arrangement area 70*b* as the target area via the setting UI, and designate the prohibition time zone as "00:00 to 06:00" for this target area. Upon receiving such an input via the setting UI, the terminal device 30 sends the second setting command including an identifier of the arrangement area 70*b* to the server 10. Based on the second setting command, the server controller 14 sets all the utterance devices 20 ("cooking appliances" and "refrigerator" in the example shown in FIG. 6) arranged in the target area which is the arrangement area 70*b* as target devices, and sets a prohibition time zone for the devices.

Different prohibition time zones may be set for different arrangement areas 70*a* to 70*e*. For example, a second setting designation includes the target area which is the arrangement area 70*a* and the prohibition time zone of "16:00 to 19:00" for the arrangement area 70*a*. In one embodiment, the prohibition time zone setting command may include a plurality of setting designations comprehensively. For example, the second setting command may further include, in addition to a target area that is the arrangement area 70*b*, and a prohibition time zone of "00:00 to 06:00" for the arrangement area 70*b*, a target area that is the arrangement area 70*a*, and a prohibition time zone of "16:00 to 19:00" for the arrangement area 70*a*.

Based on the second setting designation, the server controller 14 sets all the utterance devices 20 ("television", "audio device", "air conditioner a", and "cleaning robot" arranged in the target area which is the arrangement area 70*a*) as target devices, and sets a prohibition time zone of "16:00-19:00".

In one embodiment, different prohibition time zones may be set for a plurality of utterance devices 20 in the same arrangement area. For example, after the prohibition time zone is set to "00:00 to 06:00" for the utterance devices 20 arranged in the arrangement area 70*a*, a prohibition time zone of "16:00 to 19:00" may be added for the "television", or a prohibition time zone of "00:00 to 06:00" may be changed to "01:00-05:00" for the "audio device" in the arrangement area 70*a*.

The setting of the prohibition time zone for a specific target area may be collectively applied to the utterance devices 20 arranged in the target area. In this way, it is possible to keep a quiet state so as to avoid utterance in the entire specific space (target area), and it is possible to further reduce the discomfort given to the user. The term "quiet state" in the present disclosure refers to a state in which the utterance device 20 does not speak, and does not mean that there is no sound from the target area. The sound generated by the operation of the utterance device 20 itself, for example, the music played from the audio device, the operating sound of the washing machine, etc. are out of the range of the utterance control and are not related to the utterance being in a quiet state.

Then, since the user can collectively set the prohibition time zone of the utterance devices 20 in the same arrangement area, the utterance function becomes easier to use. In addition, since it can be set individually even after the collective setting, the degree of freedom in setting the prohibition time zone is high, and the utterance function becomes easier to use.

Third Embodiment

<Case of Designating Representative Device (Representative Home Appliance) in Specific Arrangement Area>

In the third embodiment, the user can designate a "representative device" in a specific arrangement area, and the server controller 14 may cause the representative device to utter instead of another utterance device 20 in the same arrangement area.

Figure 7:
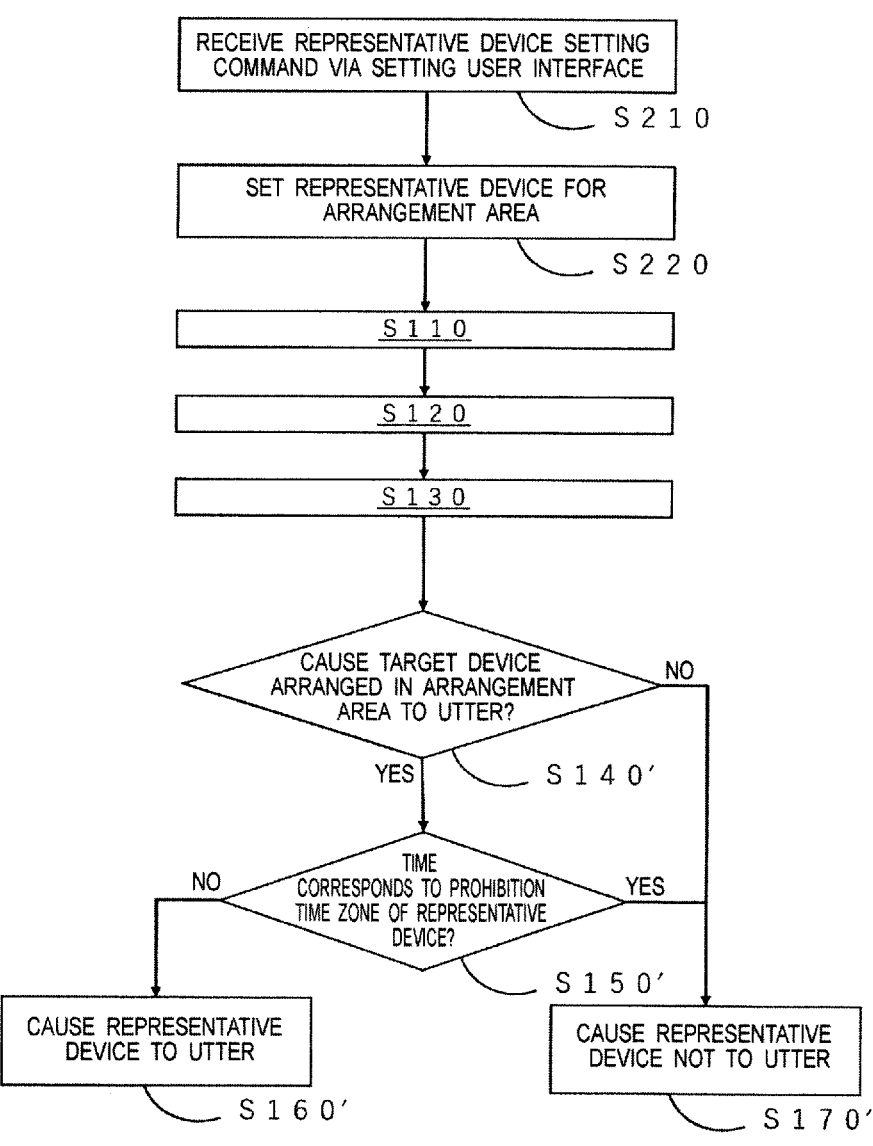
FIG. 7 is a flowchart of an example of a method for controlling an utterance device in a third embodiment.

FIG. 7 is a flowchart of an example of the method for controlling the utterance device in the third embodiment. The server controller 14 receives a representative device setting command via the setting UI (step S210). The representative device setting command designates one of the plurality of utterance devices 20 arranged in the specific arrangement area as a representative device, based on the input of the user. In one embodiment, the setting of the representative device is performed by a UI different from the setting UI described above.

Upon receiving the representative device setting command, the server controller 14 sets the representative device for the arrangement area, based on the representative device setting command (step S220). In other words, in step S220, the server controller 14 associates the representative device of one specific arrangement area with another utterance device 20 of this arrangement area.

Figure 8:
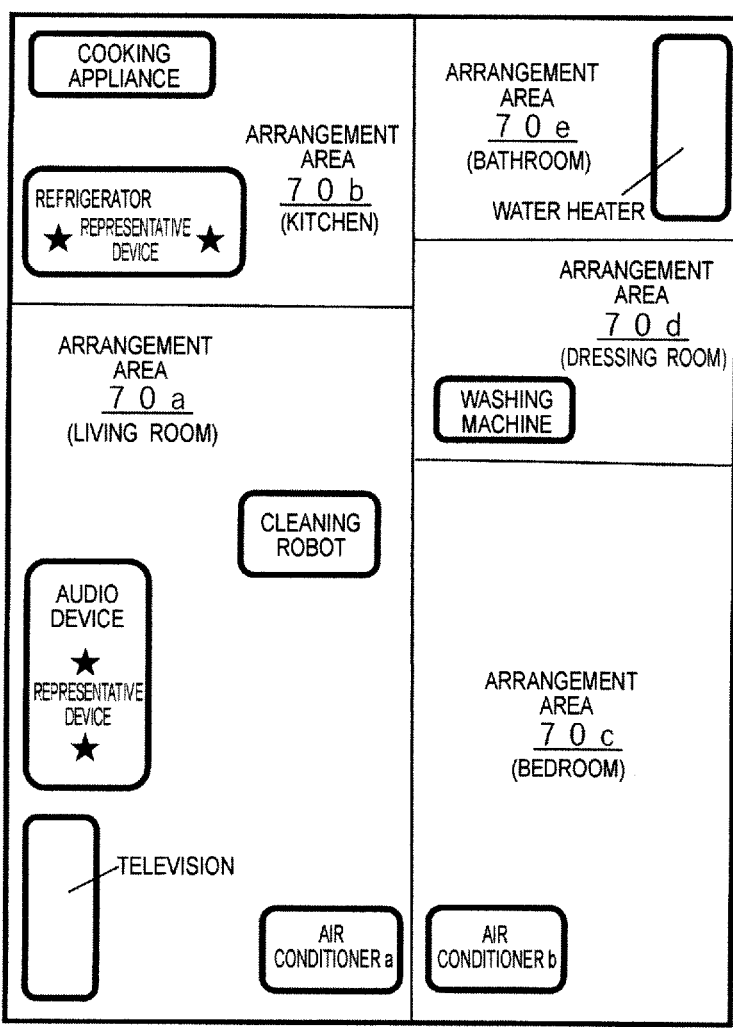
FIG. 8 is an example of arrangement areas in the third embodiment.

FIG. 8 is an example of the arrangement areas in the third embodiment. In the embodiment of FIG. 8, the utterance device 20 of the "audio device" is set as the representative device in the arrangement area 70*a*, and the utterance device 20 of the "refrigerator" is set as the representative device in the arrangement area 70*b*. If the "television" is to be caused to utter "Recording of the XX program has been finished.", the server controller 14 determines whether or not the representative device is set in the arrangement area 70*a* where the "television" is arranged. Since the representative device of the "audio device" is set in the arrangement area 70*a*, the server controller 14 is to cause the representative device of the "audio device" to utter "Recording of the XX program has been finished." instead of the "television" (S140'-S170').

As shown in FIG. 7, the server controller 14 may set the prohibition time zone for the utterance devices 20 including the representative device according to steps S110, S120, and S130 described above before causing the target device to utter.

The order of steps S110 to S130 and steps S210 to S220 is not limited to the example shown in FIG. 7. A predetermined utterance device 20 may be set as a representative device after the prohibition time zone is set.

In one embodiment, the server controller 14 may automatically set the representative device. For example, the server controller 14 may set, as a representative device, the utterance device 20 having an identifier with the smallest number, the utterance device 20 closest to the center of the arrangement area, the utterance device 20 having the highest utterance frequency, or the utterance device 20 having the highest user operation frequency, among the plurality of utterance devices 20 in this arrangement area.

When the representative device is set, the server controller 14 performs the following steps S140' to step S170' instead of steps S140 to S170 described above while treating the representative device as the target device instead of the original target device.

In step S140', the server controller 14 determines whether or not the representative device causes the target device arranged in the designated arrangement area to utter. More specifically, the server controller 14 determines whether or not the target device is caused to utter, and determines whether or not the representative device is set in the arrangement area where the target device is arranged. When the representative device is determined to be set, the server controller 14 treats the representative device as the target device instead of the original target device, and is to cause the representative device to utter.

When the target device arranged in the arrangement area is to be caused to utter, the server controller 14 acquires the time for causing the target device to utter, that is, the current time, and determines whether or not the current time corresponds to the prohibition time zone of the representative device (step S150'). When the current time is determined to not to correspond to the prohibition time zone of the representative device, the server controller 14 causes the representative device to utter (step S160'). On the other hand, when the current time is determined to correspond to the prohibition time zone of the representative device, the server controller 14 does not cause the representative device to utter (step S170').

For example, it is assumed that the "audio device" is set as a representative device of the arrangement area 70_a_. Then, the prohibition time zones of "00:00 to 06:00" and "16:00 to 19:00" are set for the "television" in the arrangement area 70_a_, and the prohibition time zone of "01:00 to 05:00" is set for the "audio device" in the arrangement area 70_a_. When the current time is "05:30", it does not correspond to the prohibition time zone of the "audio device" which is the representative device, so that the utterance content originally intended to be uttered by the "television" is uttered by the "audio device".

When the same prohibition time zone is set for all the utterance devices 20 in the arrangement area, the server controller 14 may perform steps S140 to S170 described above in place of steps S140' to S170' in the flow of FIG. 7.

According to the method, server, utterance device, and program for controlling utterance of the utterance device of the third embodiment, the discomfort given to the user can be reduced according to the setting of the prohibition time zone while the utterance device 20 is caused to utter more freely.

Fourth Embodiment

<Case of Movable Target Device>

In a fourth embodiment, the utterance device 20 as the target device is movable over a plurality of arrangement areas. The server controller 14 sets prohibition time zones in the arrangement areas, and further determines whether or not the target device can utter, based on the arrangement area where the movable target device is located.

As in the second embodiment, the user may designate at least one arrangement area as a target area via the setting UI, and designate the prohibition time zone for this target area.

The server controller 14 receives a prohibition time zone setting command from the terminal device 30 in steps S110 and S120 described above. In the fourth embodiment, the prohibition time zone setting command is a third setting command including a target area which is at least one of the arrangement areas and a third time zone for the target area. In step S130, the server controller 14 can set the prohibition time zone of the movable target device, based on the third setting command.

Figure 9:
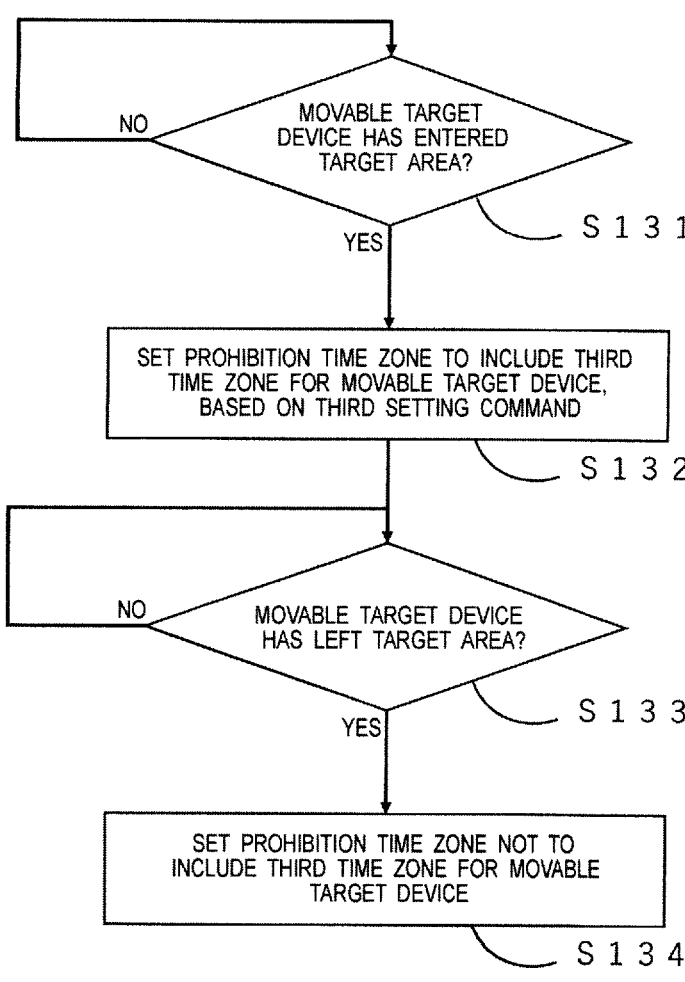
FIG. 9 is a flowchart of an example of step S130 in a fourth embodiment.
Figure 10:
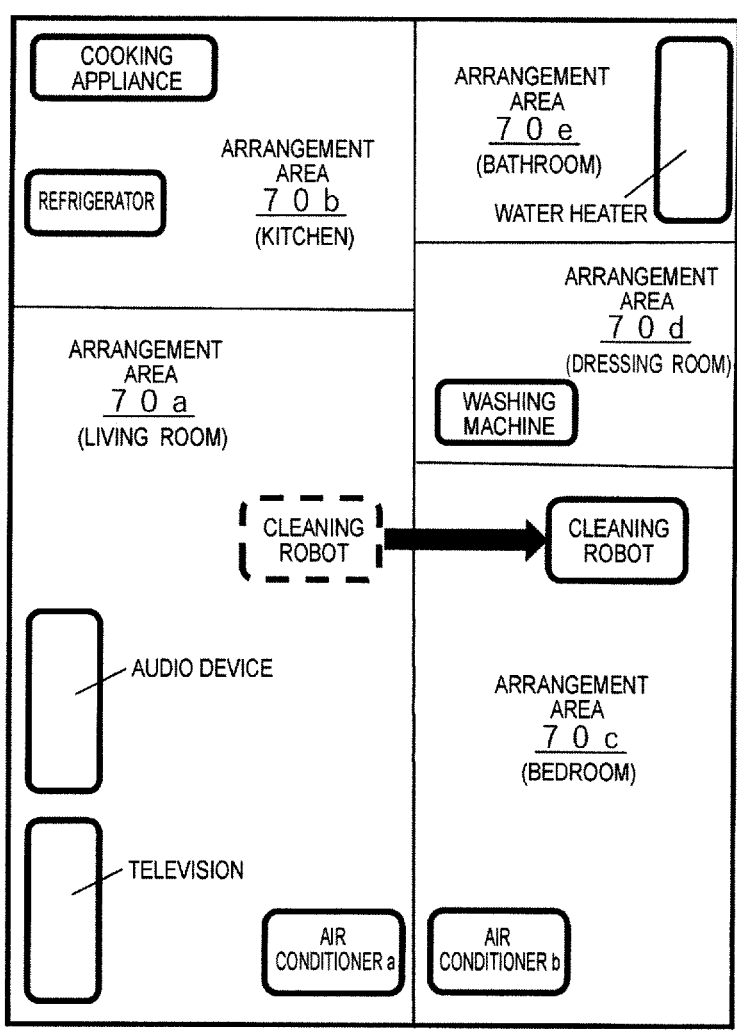
FIG. 10 is an example of arrangement areas in the fourth embodiment.

FIG. 9 is a flowchart of an example of step S130 in the fourth embodiment. In the fourth embodiment, step S130 includes steps S131 to S134. FIG. 10 is an example of the arrangement areas in the fourth embodiment.

First, the server controller 14 determines whether or not the movable target device has entered the target area (step S131). The utterance device 20 may be a device movable by itself such as a "cleaning robot" or a device movable by being carried by the user such as a "portable television" or a "portable audio device". The target device which is such an utterance device 20 is movable away from the initially arranged arrangement area and over a plurality of arrangement areas. For example, the "cleaning robot" shown in FIG. 10 is movable over the arrangement area 70_a_, the arrangement area 70_ab_, and the arrangement area 70_c_.

In one embodiment, the movable utterance device sends device information including the current position to the server 10, and the server controller 14 determines the arrangement area where the utterance device 20 is located, based on the device information. In another embodiment, the device storage 21 of the movable utterance device 20 stores information on the arrangement area, for example, a map of the arrangement area. The device controller 22 of the movable utterance device 20 collates the current position with the information of the arrangement area to determine the location arrangement area, and sends the device information including the location arrangement area to the server 10.

The server controller 14 determines or receives the arrangement area where the movable utterance device 20 is located, and collates the location arrangement area with the target area to determine whether or not the movable target device has entered the target area. When the movable target device is determined to have entered the target area, the server controller 14 sets the prohibition time zone to include the third time zone for the movable target device, based on the third setting command (step S132).

For example, it is assumed that the user designates the arrangement area 70_c_ as the target area via the setting UI, and designates the prohibition time zone as "00:00 to 06:00" for this target area. Then, the terminal device 30 sends an identifier of the arrangement area 70_c_ and the third setting command including the prohibition time zone to the server 10. Based on the third setting command, the server controller 14 sets the utterance device 20 ("air conditioner b") currently located in the target area which is the arrangement area 70_c_ as the target device, and sets the utterance device 20 of the "cleaning robot" that has entered the arrangement area 70_c_ as the target device, and sets the prohibition time zone.

In this way, even when a new utterance device 20 enters the arrangement area where a quiet state is to be maintained, the quiet state of the arrangement area is maintained.

The server controller 14 further determines whether or not the movable target device has left the target area (step S133). When the movable target device is determined to have left the target area, the prohibition time zone is set not to include the third time zone for the movable target device (step S134). That is, the movable target device is set to the prohibition time zone of the target area when it enters the target area, and this setting is deleted from the movable target device when the movable target device leaves the target area.

For example, it is assumed that the prohibition time zone of the arrangement area 70a is set to "01:00-05:00", and the prohibition time zone of the arrangement area 70c is set to "00:00 to 06:00". When the "cleaning robot" enters the arrangement area 70a, the server controller 14 sets the "cleaning robot" as the target device of the arrangement area 70c and adds the time zone "01:00-05:00" to the prohibition time zone. Later, when the "cleaning robot" leaves the arrangement area 70a and enters the arrangement area 70c, the server controller 14 sets the "cleaning robot" as the target device of the arrangement area 70c, deletes the time zone of "01:00-05:00" from the prohibition time zone, and adds the time zone of "00:00 to 06:00".

In one embodiment, the server controller 14 may set the prohibition time zone, based on a condition different from the condition that the target device enters or leaves the target area. For example, the server controller 14 may apply the setting of the prohibition time zone of the arrangement area where the target device is located to the target device. At the time of application, the server controller 14 performs setting so as to add a prohibition time zone for the target device or rewrite the prohibition time zone for the target device to the prohibition time zone of the location arrangement area. In this embodiment, the server controller 14 may determine whether or not the arrangement area where the movable target device is located has changed. When the change is determined to have occurred, the server controller 14 may set the arrangement area where the movable target device is currently located as the target area, and apply the prohibition time zone of the target area to the target device.

According to the method, server, utterance device, and program for controlling utterance of the utterance device of the fourth embodiment, the prohibition time zone can be dynamically set even for the movable utterance device 20. Therefore, it is possible to prevent the utterance device 20 entering the quiet arrangement area from inadvertently uttering and breaking the quiet state, and it is possible to more securely reduce the discomfort given to the user. Further, since the prohibition time zone of the movable utterance device 20 can be dynamically set, the degree of freedom in setting the prohibition time zone is high, and the utterance function becomes easier to use.

Fifth Embodiment

<Case of Grouped Utterance Device>
In a fifth embodiment, at least one utterance device 20 is grouped into a device group (home appliance group). The server controller 14 can set a prohibition time zone for each device group.

Figure 11:
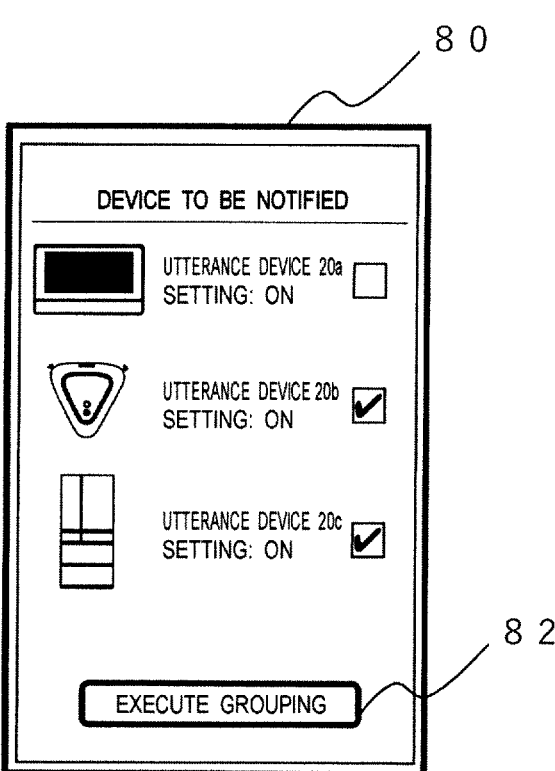
FIG. 11 is an example of a setting user interface for grouping in a fifth embodiment.

The user may group the utterance devices 20 via the setting UI or another UI. FIG. 11 is an example of the setting UI for grouping in the fifth embodiment. A screen 80 of the setting UI displays information on at least one utterance device 20. In the example shown in FIG. 11, information on the utterance device 20a "television", the utterance device 20b "cleaning robot", and the utterance device 20c "refrigerator" are displayed. The user may select at least one utterance device 20 and press the button 82 to perform grouping. In the example shown in FIG. 11, the utterance device 20b "cleaning robot" and the utterance device 20c "refrigerator" are selected as the target of grouping.

Although not shown in FIG. 11, the user may manage the device groups, such as new registration, name change, member change, etc., via the setting UI.

Upon receiving a user's selection and button press input via the setting UI, the terminal device 30 sends a grouping command to the server 10. The grouping command includes information on the designated device group (for example, the identifier or name of the device group) and information on the utterance device 20 that is to be assigned to the device group (for example, the identifier or name of the utterance device 20).

For example, the server controller 14 executes a step of receiving the grouping command via the setting UI, before step S140 shown in FIG. 2. As described above, the grouping command designates that at least one utterance device belongs to the device group.

In the fifth embodiment, the prohibition time zone setting command is the fourth setting command including the fourth time zone for the device group. Then, in step S130, the server controller 14 sets a prohibition time zone to include the fourth time zone for the target device(s) which is an utterance device(s) belonging to the device group, based on the fourth setting command.

FIG. 12A is an example of the device group in the fifth embodiment. In this example, the device groups of "group a", "group b", and "group c" and the utterance devices 20 set as group members of the respective device groups are shown.

The server controller 14 may process the device group and the utterance device 20 belonging to the device group in the same manner as the process for the arrangement area and the utterance device 20 arranged therein described in the second to fourth embodiments. For example, in step S130 shown in FIG. 2, the server controller 14 may set all the utterance devices 20 belonging to the device group as target devices, and set the prohibition time zone to include the fourth time zone. Different prohibition time zones may be set for different device groups. Further, different prohibition time zones may be set for a plurality of utterance devices 20 belonging to the same device group. For example, after the prohibition time zone is set for all the utterance devices 20 belonging to the device group, the prohibition time zone may be added or changed individually for the specific utterance device 20.

In one embodiment, a representative device may be designated for the device group as in the third embodiment. FIG. 12B is an example of the device group in the fifth embodiment. The server controller 14 associates the representative device of one device group with another utterance device 20 belonging to this device group. In this embodiment, the server controller 14 may cause the representative device to utter instead of the other utterance device 20 in the device group, and in step S150, the server controller 14 may determine whether or not the utterance is possible, based on the prohibition time zone of the representative device. For example, since the representative device "smart speaker" is set in "group a" shown in FIG. 12B, the "smart speaker" can utter instead of the other group member "washing machine".

The user can optionally organize a device group. For example, the utterance devices 20 arranged in different arrangement areas may be put in the same device group, or different types of utterance devices 20 may be put in the same device group.

According to the method, server, utterance device, and program for controlling utterance of the utterance device of the fifth embodiment, the prohibition time zone for the device groups can be easily set collectively, and the utterance function becomes easier to use. Since the user can freely organize a device group regardless of the position and type of the utterance device, the degree of freedom in setting the prohibition time zone is higher. In addition, since it can be set individually even after the collective setting, the degree of freedom in setting the prohibition time zone is high, and the utterance function becomes easier to use.

Sixth Embodiment

<Case of Setting Made by Plurality of Different Terminal Devices or User>

In a sixth embodiment, the prohibition time zones can be set for the same target device by different users or by a user using different terminal devices. The server controller 14 can synchronize the settings for the same target device.

Figure 13:
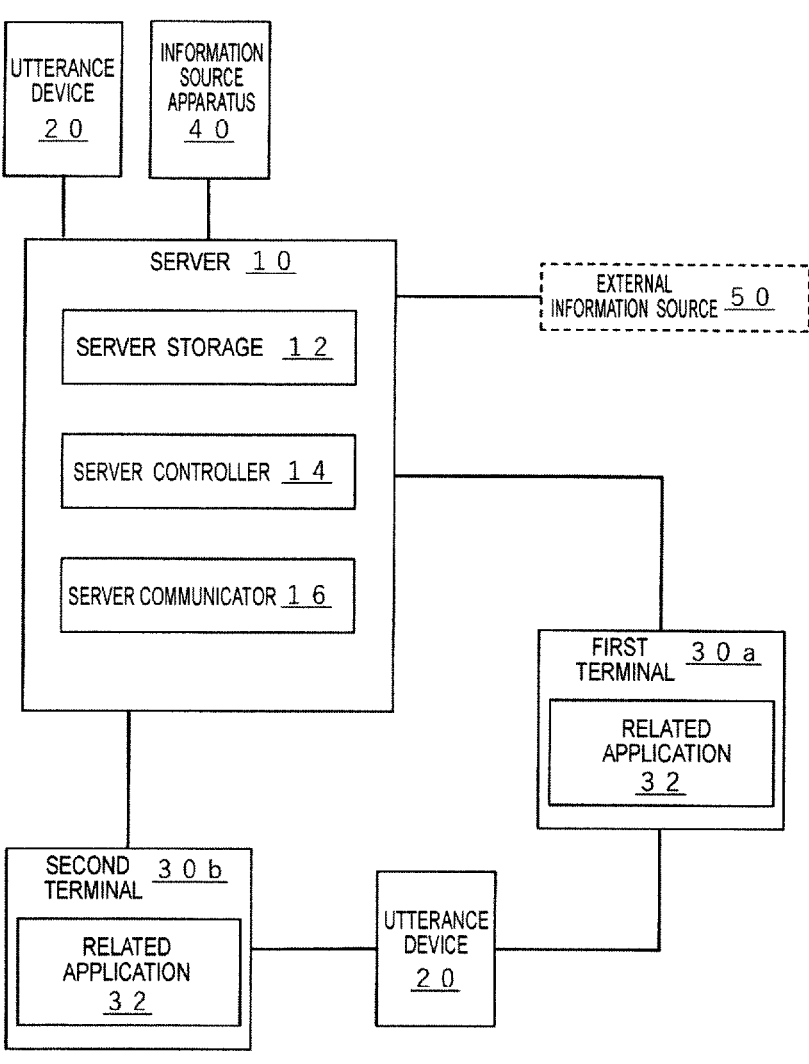
FIG. 13 is a block diagram showing a schematic configuration of an utterance device and a server controlling utterance of the utterance device in a sixth embodiment.

FIG. 13 is a block diagram showing a schematic configuration of an utterance device and a server controlling utterance of the utterance device in the sixth embodiment. In this embodiment, the terminal device 30 includes a first terminal 30a and a second terminal 30b, and the user(s) can set a prohibition time zone using the first terminal 30a or/and the second terminal 30b. The user of the first terminal 30a and the user of the second terminal 30b may be the same or different. Both the first terminal 30a and the second terminal 30b can display the setting UI and send a prohibition time zone setting command to the server 10, based on the user input.

Figure 14:
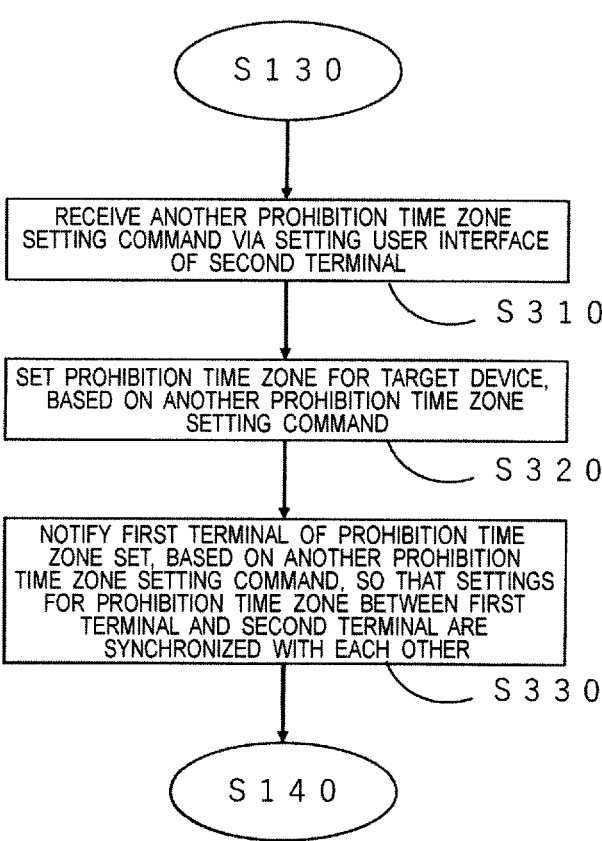
FIG. 14 is a flowchart of an example of a method for controlling an utterance device in the sixth embodiment.
Figure 15:
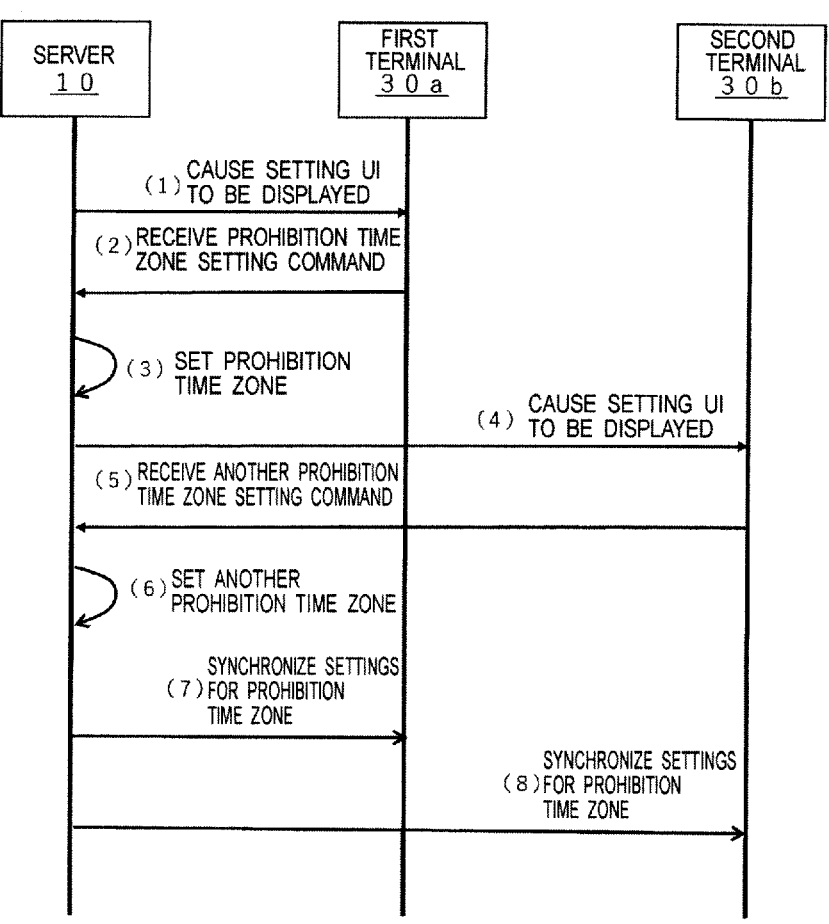
FIG. 15 is a sequence diagram of an example of a method for controlling an utterance device in the sixth embodiment.

FIG. 14 is a flowchart of an example of the method for controlling the utterance device in the sixth embodiment. FIG. 15 is a sequence diagram of an example of the method for controlling the utterance device in the sixth embodiment. First, the server controller 14 performs steps S110 to S130 shown in FIG. 2 using the first terminal 30a, and sets a prohibition time zone for the target device. After S130, the server controller 14 further performs steps S310 to S330 shown in FIG. 14 using the second terminal 30b, and sets a prohibition time zone for the target device.

The server controller 14 receives another prohibition time zone setting command, via the setting UI of the second terminal 30b (step S310). Then, the server controller 14 sets the prohibition time zone for the target device, based on another prohibition time zone setting command (step S320). For example, after the user "father" uses the first terminal 30a to set a prohibition time zone of "00:00 to 06:00" for the "television", the user "mother" may use the second terminal 30b to additionally set a prohibition time zone of "16:00 to 19:00" for the same "television".

Then, the server controller 14 notifies the first terminal 30a of the prohibition time zone set, based on another prohibition time zone setting command, so that the settings for the prohibition time zone between the first terminal 30a and the second terminal 30b are synchronized with each other (step S330). Similarly, for synchronization, the server controller 14 may notify the second terminal 30b of the prohibition time zone set, based on the prohibition time zone setting command from the first terminal 30a.

In one embodiment, the user can set the prohibition time zone using the controller of the terminal device 30, or/and, the utterance device 20 or the UI of the utterance device 20 main body (see the embodiment of FIG. 4). In this case, the server controller 14 may similarly notify the prohibition time zones so that the settings for the prohibition time zone between the terminal device 30 and the utterance device 20 main body or its controller are synchronized with each other.

In one embodiment, if there is still a slot that can be set for the prohibition time zone, in step S320, the prohibition time zone is added, based on another prohibition time zone setting command. If all the configurable slots are filled, that is, if the upper limit (for example, three slots) has already been set, the setting of the old prohibition time zone may be deleted from the setting in the order of made time, and new setting may be added.

In one embodiment, for the same utterance device 20, the prohibition time zones respectively set by the plurality of users may be processed for each user. For example, for the utterance device 20, each user may set up to three prohibition time zones. In this way, personalization setting can be made for each user. In one embodiment, the utterance device 20 or the server controller 14 can acquire the user's position using a human sensor, a Bluetooth® connection, GPS technology, and the like. In step S150 shown in FIG. 2, the server controller 14 may specify a user closest to the target device, and determine whether or not the utterance is possible based on the prohibition time zone set for the user.

According to the method, server, utterance device, and program for controlling utterance of the utterance device of the sixth embodiment, the prohibition time zones can be set by different terminal devices or users, and the settings of the prohibition time zones can also be synchronized with each other. Since the setting can be executed by a plurality of devices including the terminal device and the utterance device, the setting can be performed more conveniently. In addition, personalization setting can be made for each user, and the utterance function becomes easier to use.

Seventh Embodiment

<Case of Utterance Exceptionally Allowed During Prohibition Time Zone>

In principle, the target device 20 is not caused to utter during the prohibition time zone, but in the seventh embodiment, depending on the utterance content, for example, if the utterance content is highly urgent, the target device can be exceptionally caused to utter even during the prohibition time zone.

Figure 16:
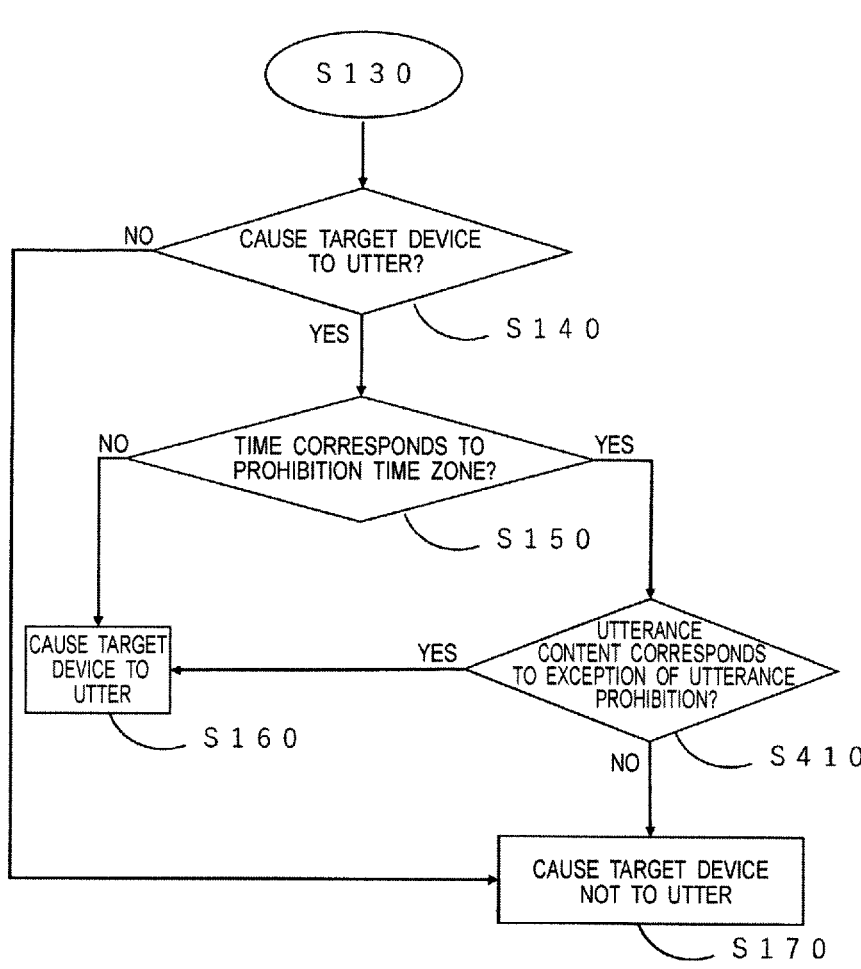
FIG. 16 is a flowchart of an example of a method for controlling an utterance device in a seventh embodiment.

FIG. 16 is a flowchart of an example of the method for controlling the utterance device in the seventh embodiment. The server controller 14 may perform utterance control, based on a predefined exception for utterance prohibition. For example, the server controller 14 may perform utterance control, based on a predefined "utterance prohibition exception criterion". FIG. 17 is an example of the utterance prohibition exception criterion in the seventh embodiment.

The prohibition time zone is set as a time zone in which utterance is not desired by the user. However, if the utterance content is related to a highly urgent situation, for example, if it is related to the occurrence of a situation that may cause harm to the user, the utterance content should be notified to the user. In this way, matters that the user should be notified even during the prohibition time zone, that is, matters that the importance of the utterance content is considerably high for the user are predefined in the utterance prohibition exception criterion. The utterance prohibition exception criterion may be stored in the server storage 12.

As shown in FIG. 16, when the server controller 14 is to cause the target device to utter ("Yes" in step S140) and determines that the current time corresponds to the prohibition time zone ("Yes" in step S150), the server controller 14 further determines whether or not the utterance content corresponds to the exception of utterance prohibition (step S410). For example, the server controller 14 further determines whether or not the utterance content corresponds to the utterance prohibition exception criterion stored in the server storage 12. When the server controller 14 determines that the utterance content corresponds to the exception of utterance prohibition ("Yes" in step S410), that is, when the importance/urgency of the utterance content is relatively high for the user, the server controller 14 cause the target device to utter the utterance content regardless of whether or not the current time corresponds to the prohibition time zone (S160). On the other hand, when the utterance content is determined to not to correspond to the exception of utterance prohibition ("No" in step S410), that is, when the importance/urgency of the utterance content is relatively low for the user, the server controller 14 does not cause the target device to utter the utterance content (S160).

For example, if the room temperature of a room is above a predetermined value (for example, 35° C.) or below a predetermined value (for example, 10° C.), it is likely to have an adverse effect on the user's body. In this case, even if the current time corresponds to the prohibition time zone, the target device is caused to utter utterance that informs the user of the urgent situation or utterance that prompts the user to start the air conditioner.

In one embodiment, when the utterance content does not correspond to the utterance prohibition exception criterion and the target device is not caused to utter, the server controller 14 further determines whether or not the utterance content corresponds to the utterance hold criterion (see the first embodiment). There is a case where the importance/urgency of the utterance content is not high enough to meet the utterance prohibition exception criterion, but it meets the utterance hold criterion. In this case, as described above, the server controller 14 holds the utterance content and causes the target device to utter the utterance content when the prohibition time zone ends. On the other hand, when the utterance content does not correspond to both the utterance prohibition exception criterion and the utterance hold criterion, the server controller 14 may discard the utterance content.

In one embodiment, the server storage 12 stores the processing criteria instead of the utterance prohibition exception criterion. The processing criteria include an utterance condition in which the utterance function may be triggered, the processing and utterance content corresponding to the utterance condition, and an exception flag indicating whether or not the utterance function is an exception. In step S140 or step S140', the server controller 14 may determine whether or not to cause the target device to utter by determining whether or not the utterance condition is satisfied. In step S410, the server controller 14 may determine whether or not the utterance content corresponds to the exception of utterance prohibition, based on the exception flag.

Further, the utterance condition may include the type of the information source apparatus 40, the operating state of the information source apparatus 40, the utterance possible time (that is, a time zone other than the prohibition time zone), and the like. The server controller 14 can execute the utterance prohibition function and an exception of the utterance prohibition function by filtering a specific condition. In this case, step S140, step S150, and step S170 may be integrated. For example, for the utterance device 20, a prohibition time zone of "00:00 to 06:00" is set, and an utterance possible time of "06:01 to 24:00" is set. When determining whether or not to make utterance, it may be determined whether or not the utterance content corresponds to the exception of the utterance prohibition by filtering the utterance condition by the current time and the utterance possible time.

According to the method, server, utterance device, and program for controlling utterance of the utterance device of the seventh embodiment, depending on the utterance content, for example, if the utterance content is highly urgent, the utterance device can be exceptionally caused to utter even during the prohibition time zone. Therefore, the utterance that should be immediately notified to the user is not prohibited, and the utterance is made accordingly.

Eighth Embodiment

<Case where Setting Prohibition Time Zone and Determination Whether or not to Utter are Performed by Utterance Device>

In an eighth embodiment, the setting of the prohibition time zone and the determination of whether or not the utterance is possible are performed not by the server controller 14 but by the utterance device 20 itself.

Figure 18:
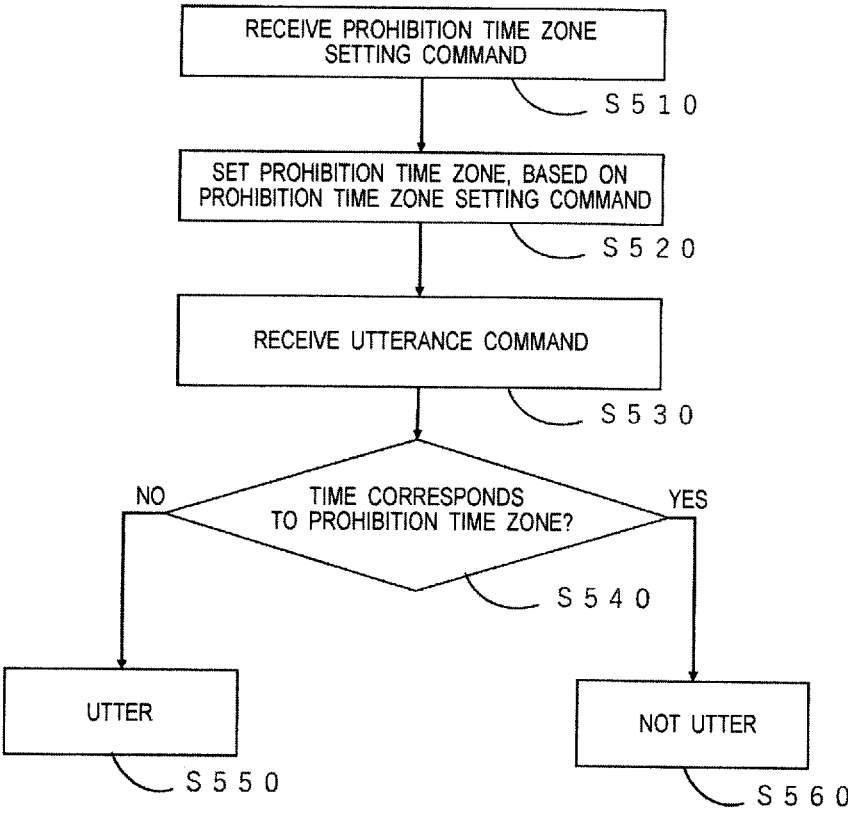
FIG. 18 is a flowchart of an example of a method for controlling an utterance device in an eighth embodiment.

FIG. 18 is a flowchart of an example of the method for controlling the utterance device in the eighth embodiment. The device storage 21 of the utterance device stores the prohibition time zone during which the utterance is not possible. The device controller 22 of the utterance device 20 is configured to execute the flowchart of FIG. 18.

First, the device controller 22 receives a prohibition time zone setting command from the terminal device 30 or the server 10 (step S510). The prohibition time zone setting command includes a prohibition time zone designated by the user for the utterance device 20 via the setting UI. The device controller 22 sets the prohibition time zone of the utterance device 20 itself based on the received prohibition time zone setting command (step S520). When the device controller 22 receives the utterance command from the server 10 via the device communicator 23 (step S530), the device controller 22 acquires the current time and determines whether or not the current time corresponds to the prohibition time zone (step S540). When the current time is determined to not to correspond to the prohibition time zone ("No" in step S540), the device controller 22 utters the utterance content set by the server 10 (step S550). On the other hand, when the current time is determined to correspond to the prohibition time zone ("Yes" in step S540), the device controller 22 does not utter (step S560).

In one embodiment, the device storage 21 may store the arrangement area where the utterance device 20 is located, and set the prohibition time zone of the utterance device 20 itself based on the prohibition time zone for the arrangement area. In one embodiment, the device communicator 23 can communicate with the representative device of the arrangement area where the utterance device 20 is located, or communicate with the representative device of the device group to which the utterance device 20 belongs. The device controller 22 sends the utterance content to be uttered to the representative device to cause the representative device to utter. In one embodiment, the device storage 21 stores the utterance hold criterion or the utterance prohibition exception criterion. Based on these criteria, the device controller 22 determines whether to utter within the prohibition time zone, or to hold or discard the utterance content that is determined not to be uttered.

According to the method, server, utterance device, and program for controlling utterance of the utterance device of the eighth embodiment, the utterance device 20 itself can set the prohibition time zone and determine whether or not the utterance is possible.

<Case Example of Using Method, Server, Utterance Device, and Program for Controlling Utterance of Utterance Device>

According to the method, server, utterance device, and program for controlling utterance of the utterance device described in the present disclosure, the prohibition time zone can be freely set, and the utterance function of the utterance device can be easily used. Therefore, the setting of the prohibition time zone may be used according to various situations. Hereinafter, some setting case examples of the prohibition time zone will be described, but the scope of the present disclosure is not limited to these.

Case Example 1

In a home with a small child, a user such as a parent may set a prohibition time zone according to the sleeping time zone of the child. For example, if a child often sleeps during a time zone of "22:00-08:00", a prohibition time zone of "22:00-08:00" may be set for the utterance device arranged in the child's bedroom.

Case Example 2

If a user hase a visit and he/she knows the visit time in advance, a prohibition time zone may be set according to the visit time. For example, if a tutor comes every Wednesday from 19:00 to 21:00, a prohibition time zone of "22:00 to 08:00 on every Wednesday" may be set for the utterance device around the study desk.

Case Example 3

The prohibition time zone may be set according to the time zone when the user customarily sleeps. For example, the user may set a time zone of "01:00-05:00", during which the user normally sleeps well, as the prohibition time zone for all the utterance devices arranged in the bedroom.

Case Example 4

In a case of working or studying in a house, the prohibition time zone may be set according to the time zone when the user wants to concentrate on his/her work. For example, for a user who works from home, the working hours of "09:00 to 17:30" may be set as the prohibition time zone for the utterance device within a predetermined range.

<Program Used in Terminal that Communicates with Server 10 that Controls Utterance of Utterance Device>

The terminal that communicates with the server 10, for example, the utterance device 20 or the terminal device 30, has a program used to execute the control method as described above.

When a program for executing utterance control is used in the utterance device 20, the program is stored in the device storage 21. The device controller 22 realizes the utterance control function by executing the program. In one embodiment, the device controller 22 receives an utterance instruction from the server 10 and utters by executing the program. In another embodiment, the device controller 22 performs the control method for the utterance device as in the eighth embodiment by executing the program.

When a program for executing utterance control is used in the terminal device 30, the program is stored in the storage of the terminal device 30. By executing the program, the terminal device 30 receives user input about the prohibition time zone (for example, designation of the target device or designation or change of the prohibition time zone) in the setting UI, and sends the prohibition time zone setting instruction to the server 10 or the utterance device 20, based on the user input.

The above is only specific embodiments of the present disclosure, and the scope of protection of the present disclosure is not limited thereto. The present disclosure includes the contents described above in the drawings and the specific embodiments described above, but the present disclosure is not limited to these contents. Various embodiments or examples disclosed can be combined without departing from the scope or gist of the disclosure. Modifications that do not deviate from the functional and structural principles of the present disclosure are within the scope of the claims.

REFERENCE SIGNS LIST

10 Server controlling utterance of utterance device (server)
12 Server storage
14 Server controller
16 Server communicator
20 Utterance device
21 Device storage
22 Device controller
23 Device communicator
24 Speaker
25 Sensor
30 Terminal device
30*a* First terminal
30*b* Second terminal
32 Related application
40 Information source apparatus
50 External information source
60, 62*a*, 62*b*, 64*a*, 64*b*, 65, 67, 69, 80 Screen
61*a*, 61*b*, 61*c*, 61*d*, 61*e*, 63*a*, 63*b*, 66, 68*a*, 68*b*, 82 Button
70*a*, 70*b*, 70*c*, 70*d*, 70*e* Arrangement area

The invention claimed is:

1. A method for controlling utterance of an utterance device, comprising:

causing a terminal device to display a setting user interface;

receiving, via the setting user interface, a prohibition time zone setting command;

setting a prohibition time zone for a target device which is at least one of the utterance devices, based on the prohibition time zone setting command; and causing the target device to utter, when a time for causing the target device to utter is determined not to correspond to the prohibition time zone;

wherein each of the utterance devices is arranged in any one of a plurality of arrangement areas;

wherein the prohibition time zone setting command is a second setting command including a target area which is at least one of the arrangement areas and including a second time zone for the target area;

wherein when setting the prohibition time zone, the prohibition time zone is set to include the second time zone for a target device which is the utterance device arranged in the target area based on the second setting command; and wherein the method for controlling utterance of an utterance device further comprises:

receiving, via the setting user interface, a representative device setting command for designating one of the plurality of utterance devices arranged in one arrangement area as a representative device;

setting the representative device for the arrangement area; and causing the representative device to utter, when a time for causing the target device arranged in the arrangement area to utter is determined not to correspond to the prohibition time zone of the representative device.

2. The method for controlling utterance of an utterance device according to claim 1, wherein the prohibition time zone setting command is a first setting command including the target device and one or a plurality of first time zones for the target device;

wherein when setting the prohibition time zone, the prohibition time zone is set to include the one or the plurality of the first time zones for the target device, based on the first setting command.

3. The method for controlling utterance of an utterance device according to claim 1, wherein the target device is movable over a plurality of arrangement areas;

wherein the prohibition time zone setting command is a third setting command including a target area which is at least one of the arrangement areas and including a third time zone for the target area;

wherein setting the prohibition time zone includes:

setting the prohibition time zone to include the third time zone for the movable target device based on the third setting command, when the movable target device is determined to have entered the target area; and setting the prohibition time zone not to include the third time zone for the movable target device, when the movable target device is determined to have left the target area.

4. The method for controlling utterance of an utterance device according to claim 1, further comprising:

receiving, via the setting user interface, a grouping command that designates that at least one of the utterance devices belongs to a device group;

wherein the prohibition time zone setting command is a fourth setting command including a fourth time zone for the device group;

wherein when setting the prohibition time zone, the prohibition time zone is set to include the fourth time zone for a target device which is the utterance device belonging to the device group based on the fourth setting command.

5. The method for controlling utterance of an utterance device according to claim 1, wherein the terminal device includes a first terminal and a second terminal;

wherein the method for controlling utterance of an utterance device further includes, after receiving the prohibition time zone setting command and setting the prohibition time zone setting command to include the prohibition time zone:

receiving, via the setting user interface of the second terminal, another prohibition time zone setting command;

setting a prohibition time zone for the target device, based on the another prohibition time zone setting command; and notifying the first terminal of the prohibition time zone set based on the another prohibition time zone setting command, so that settings for the prohibition time zone between the first terminal and the second terminal are synchronized with each other.

6. The method for controlling utterance of an utterance device according to claim 1, further comprising:

causing the target device to utter regardless of whether or not a current time corresponds to the prohibition time zone, when an utterance content is determined to correspond to an exception of an utterance prohibition and the target device is to be caused to utter.

7. A server controlling utterance of an utterance device, comprising:

a server storage that stores a prohibition time zone for the utterance device; and a server controller being configured to:

cause a terminal device to display a setting user interface;

receive, via the setting user interface, a prohibition time zone setting command;

set a prohibition time zone for a target device which is at least one of the utterance devices based on the prohibition time zone setting command; and cause the target device to utter, when a time for causing the target device to utter is determined not to correspond to the prohibition time zone;

wherein each of the utterance devices is arranged in any one of a plurality of arrangement areas;

wherein the prohibition time zone setting command is a second setting command including a target area which is at least one of the arrangement areas and including a second time zone for the target area; and wherein the server controller is further configured to:

set, when setting the prohibition time zone, the prohibition time zone to include the second time zone for a target device which is the utterance device arranged in the target area, based on the second setting command;

receive, via the setting user interface, a representative device setting command for designating one of the plurality of utterance devices arranged in one arrangement area as a representative device;

set the representative device for the arrangement area; and cause the representative device to utter, when a time for causing the target device arranged in the arrangement area to utter is determined not to correspond to the prohibition time zone of the representative device.

8. The server controlling utterance of an utterance device according to claim 7, wherein the prohibition time zone setting command is a first setting command including the target device and one or a plurality of first time zones for the target device;

wherein the server controller sets, when setting the prohibition time zone, the prohibition time zone to include the one or the plurality of the first time zones for the target device, based on the first setting command.

9. The server controlling utterance of an utterance device according to claim 7, wherein the target device is movable over a plurality of arrangement areas;

wherein the prohibition time zone setting command is a third setting command including a target area which is at least one of the arrangement areas and a including third time zone for the target area;

wherein the server controller is further configured to, when setting the prohibition time zone:

set the prohibition time zone to include the third time zone for the movable target device, based on the third setting command, when the movable target device is determined to have entered the target area; and set the prohibition time zone not to include the third time zone for the movable target device, when the movable target device is determined to have left the target area.

10. The server controlling utterance of an utterance device according to claim 7, wherein the server controller is further configured to receive, via the setting user interface, a grouping command that designates that at least one of the utterance devices belongs to a device group;

wherein the prohibition time zone setting command is a fourth setting command including a fourth time zone for the device group;

wherein the server controller sets, when setting the prohibition time zone, the prohibition time zone to include the fourth time zone for a target device which is the utterance device belonging to the device group, based on the fourth setting command.

11. The server controlling utterance of an utterance device according to claim 7, wherein the terminal device includes a first terminal and a second terminal;

wherein the server controller is further configured to, after receiving the prohibition time zone setting command and setting the prohibition time zone setting command to include the prohibition time zone:

receive, via the setting user interface of the second terminal, another prohibition time zone setting command;

set a prohibition time zone for the target device, based on the another prohibition time zone setting command; and notify the first terminal of the prohibition time zone set, based on the another prohibition time zone setting command so that settings for the prohibition time zone between the first terminal and the second terminal are synchronized with each other.

12. The server controlling utterance of an utterance device according to claim 7, wherein the server controller is further configured to cause the target device to utter regardless of whether or not a current time corresponds to the prohibition time zone, when an utterance content is determined to correspond to an exception of an utterance prohibition and the target device is to be caused to utter.

* * * * *